United States Patent
Lachman et al.

(10) Patent No.: US 12,006,399 B1
(45) Date of Patent: Jun. 11, 2024

(54) POLYMER AND POLYMER-DERIVED PARTICLES COMPRISING POLYFURFURYL ALCOHOL AND METHODS THEREOF

(71) Applicant: Sila Nanotechnologies Inc., Alameda, CA (US)

(72) Inventors: Eric Lachman, Dublin, CA (US); Gleb Yushin, Atlanta, GA (US); Nicholas Ingle, El Cerrito, CA (US); Mareva Fevre, Oakland, CA (US); Emma Foxly, Oakland, CA (US); Nicholas Werth, Oakland, CA (US); Elif Gurbuz, Oakland, CA (US)

(73) Assignee: SILA NANOTECHNOLOGIES, INC., Alameda, CA (US)

( * ) Notice: Subject to any disclaimer, the term of this patent is extended or adjusted under 35 U.S.C. 154(b) by 228 days.

(21) Appl. No.: 17/650,111

(22) Filed: Feb. 7, 2022

Related U.S. Application Data

(60) Provisional application No. 63/148,119, filed on Feb. 10, 2021.

(51) Int. Cl.
*C08G 65/36* (2006.01)
*C08L 71/14* (2006.01)
*H01M 4/62* (2006.01)

(52) U.S. Cl.
CPC .............. *C08G 65/36* (2013.01); *C08L 71/14* (2013.01); *H01M 4/62* (2013.01); *H01M 4/622* (2013.01)

(58) Field of Classification Search
None
See application file for complete search history.

(56) References Cited

U.S. PATENT DOCUMENTS

| | | | | |
|---|---|---|---|---|
| 4,048,715 A | * | 9/1977 | Vissers | H01M 4/62 29/623.5 |
| 2012/0225293 A1 | * | 9/2012 | Matsumoto | C08J 3/12 428/402 |

* cited by examiner

*Primary Examiner* — Christopher M Rodd
(74) *Attorney, Agent, or Firm* — MUNCY, GEISSLER, OLDS & LOWE, P.C.; Daniel Podhany

(57) ABSTRACT

Aspects relate to a method of particle fabrication, comprising mixing at least one stabilizing compound with an aqueous solution to produce a first mixture, mixing furfuryl alcohol, a derivative of furfuryl alcohol, or a mixture thereof, into the first mixture to produce a second mixture, heating the second mixture, mixing a surfactant comprising an acid moiety (e.g., an alkylbenzene sulfonic acid) and the second mixture to produce a third mixture, initiating a polycondensation reaction of the furfuryl alcohol, the derivative of the furfuryl alcohol, or the mixture thereof, in the third mixture to produce polymer (or polymer-derived) particles comprising polyfurfuryl alcohol, and (optionally) defining or modifying the glass transition temperature of the polymer or polymer-derived particles comprising polyfurfuryl alcohol.

25 Claims, 18 Drawing Sheets

POLYMER AND POLYMER-DERIVED PARTICLES COMPRISING POLYFURFURYL ALCOHOL AND METHODS THEREOF

CROSS-REFERENCE TO RELATED APPLICATIONS

The present Application for Patent claims the benefit of U.S. Provisional Application No. 63/148,119, entitled "POLYMER AND POLYMER-DERIVED PARTICLES COMPRISING POLYFURFURYL ALCOHOL AND METHODS THEREOF," filed Feb. 10, 2021, assigned to the assignee hereof, and expressly incorporated herein by reference in its entirety.

BACKGROUND

Field

Aspects of the present disclosure relates generally to polymer (or polymer-derived) particles comprising polyfurfuryl alcohol and methods thereof.

Background

Today, polymer nanospheres and microspheres have a broad range of applications, such as for use in medicine and pharmaceuticals, as starting materials for composites, nanocomposites, carbon materials, and others, as well as filtration, adsorption, and separation processes, and for enhancement of various mechanical properties, and other properties. Typically, nanospheres and microspheres made from polymer materials are synthesized through a polymerization process, for example an emulsion polymerization, a precipitation polymerization, or a suspension polymerization process, using a monomer, such as styrene, divinylbenzene, or other additional chemicals, a catalyst that generates a free radical or acts as a Lewis acid, and may contain additional precursors that act as stabilizing agents and cross-linking agents. These reactions can be done as aqueous emulsion polymerizations, where water is the primary solvent used, or organic emulsion polymerizations, where organic solvents such as ethanol are primarily used.

However, despite the useful properties and the commercial potential of polymer nanospheres and microspheres, their application has been limited due to the limitations of the current processes for synthesizing polymer nanospheres and microspheres, which produce broad particle size distributions, are not amenable across a wide range of particle sizes (e.g., from 100 nanometers to 100 microns), and frequently produce materials that are non-uniform in shape (amorphously shaped particles, agglomerates of spheres, grape-like structures, among others). Furthermore, current processes use expensive and non-renewable sources for monomer materials, such as styrene, that further complicate the industrialization of nanosphere and microsphere production.

Accordingly, there remains a need for improved processes for synthesis of (e.g., spherical) polymer or polymer-derived particles that provides greater control over particle size and particle size distributions of the polymer or polymer-derived particles (e.g., spheres), as well as their modification in the use in the synthesis of porous carbon materials. There additionally remains a need for improvements in manufacturing and industrialization of large-scale production of polymer or polymer-derived particles (e.g., nanospheres and microspheres).

SUMMARY

Embodiments disclosed herein address the above stated needs by providing improved batteries, components, and other related materials and manufacturing processes.

In an aspect, a method of particle fabrication includes: mixing at least one stabilizing compound with an aqueous solution to produce a first mixture; mixing furfuryl alcohol, a derivative of furfuryl alcohol, or a mixture thereof, into the first mixture to produce a second mixture; heating the second mixture; mixing a surfactant comprising an acid moiety and the second mixture to produce a third mixture; and initiating a polycondensation reaction of the furfuryl alcohol, the derivative of the furfuryl alcohol, or the mixture thereof, in the third mixture to produce polymer or polymer-derived particles comprising polyfurfuryl alcohol.

In some aspects, the method includes defining or modifying a glass transition temperature of the polymer or polymer-derived particles comprising polyfurfuryl alcohol.

In some aspects, wherein, prior to the modifying, the glass transition temperature of the polymer or polymer-derived particles comprising polyfurfuryl alcohol is in the range between about 20° C. to 90° C., and the modifying increases the glass transition temperature of the polymer or polymer-derived particles comprising polyfurfuryl alcohol to above about 100° C.

In some aspects, wherein, prior to the modifying, the glass transition temperature of the polymer or polymer-derived particles comprising polyfurfuryl alcohol is in the range between about 40° C. to 200° C., and the modifying eliminates the glass transition temperature of the polymer or polymer-derived particles comprising polyfurfuryl alcohol such that a glass transition of the polymer or polymer-derived particles comprising polyfurfuryl alcohol does not occur.

In some aspects, the polymer or polymer-derived particles are produced as polymer or polymer-derived particle droplets, and the glass transition temperature is modified by curing and at least partially solidifying the polymer or polymer-derived particle droplets.

In some aspects, the surfactant comprises alkylbenzene sulfonic acid.

In some aspects, the first mixture comprises the at least one stabilizing compound at a concentration of about 0.0001 wt. % to about 50.0000 wt. %. of the first mixture.

In some aspects, the at least one stabilizing compound comprises polyvinylpyrrolidone, a polyvinyl alcohol, a triblock copolymer derived from polypropylene and polyethylene, gum acacia, polyvinyl acetate, polyacrylonitrile, or a combination thereof.

In some aspects, where the at least one stabilizing compound comprises polyvinyl alcohol.

In some aspects, the first mixture is a solution with the at least one stabilizing compound being dissolved into the aqueous solution, or, wherein the first mixture is a suspension with the at least one stabilizing compound being dispersed into the aqueous solution.

In some aspects, the second mixture comprises the furfuryl alcohol, the derivative of furfuryl alcohol, or the mixture thereof, at a concentration of about 0.0001 wt. % to about 80.0000 wt. %. of the second mixture.

In some aspects, the second mixture comprises a heterogeneous solution of the at least one stabilizing compound, the aqueous solution, and the furfuryl alcohol, the derivative of furfuryl alcohol, or the mixture thereof.

In some aspects, the heating induces a transition of the second mixture from the heterogenous solution to a homogeneous solution of the at least one stabilizing compound, the aqueous solution, and the furfuryl alcohol, the derivative of furfuryl alcohol, or the mixture thereof, with an aqueous phase and a hydrophobic emulsion phase.

In some aspects, the second mixture comprises a homogenous solution of the at least one stabilizing compound, the aqueous solution, and the furfuryl alcohol, the derivative of furfuryl alcohol, or the mixture thereof, with an aqueous phase and a hydrophobic emulsion phase.

In some aspects, the heating induces a transition of the second mixture from the homogenous solution to a heterogeneous solution of the at least one stabilizing compound, the aqueous solution, and the furfuryl alcohol, the derivative of furfuryl alcohol, or the mixture thereof.

In some aspects, the heating heats the second mixture to a temperature between about 30° C. and about 100° C.

In some aspects, the surfactant is mixed into the second mixture as a neat liquid or as part of another aqueous solution.

In some aspects, the third mixture comprises the surfactant at a concentration of about 0.001 wt. % to about 30.0000 wt. % of the third mixture.

In some aspects, the surfactant is mixed into the second mixture at a first temperature that is less than a second temperature of the second mixture.

In some aspects, the surfactant is mixed into the second mixture at a first temperature that is greater than a second temperature of the second mixture.

In some aspects, the surfactant is mixed into the second mixture at the same temperature as the second mixture.

In some aspects, the polymer or polymer-derived particles exhibit a spherical shape, a near-spherical shape, or a spheroidal shape, or a combination thereof.

In some aspects, the polymer or polymer-derived particles comprise an average particle size between about 100 nanometers to about 100 microns.

BRIEF DESCRIPTION OF THE DRAWINGS

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

DETAILED DESCRIPTION

Figure 1A:
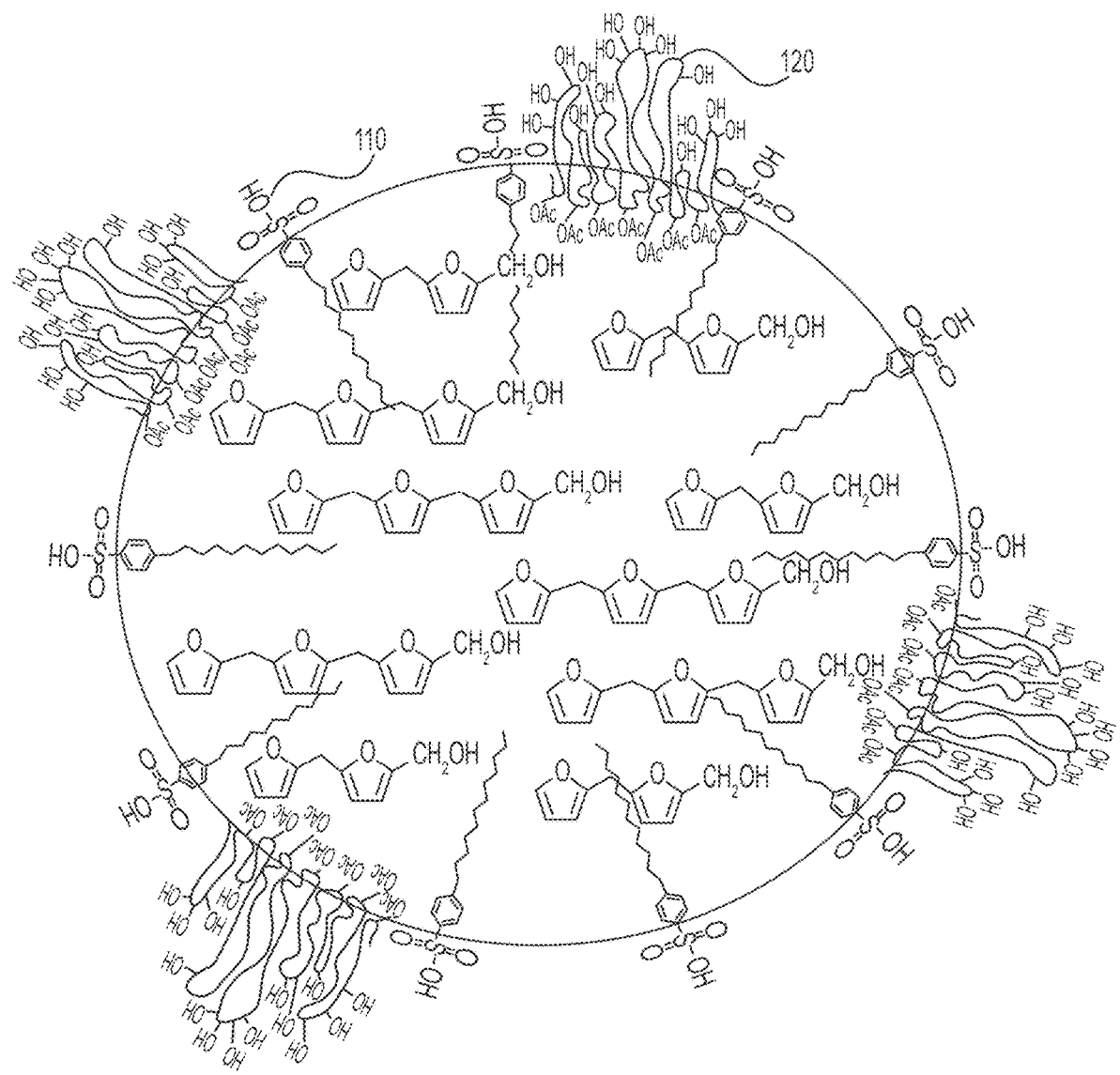
FIG. 1A illustrates a polymer particle droplet in accordance with an aspect of the disclosure.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a temperature range from about −120° C. to about −60° C. encompasses (in ° C.) a set of temperature ranges from about −120° C. to about −119°

C., from about −119° C. to about −118° C., . . . from about −61° C. to about −60° C., as if the intervening numbers (in ° C.) between −120° C. and −60° C. in incremental ranges were expressly disclosed. In yet another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range. In yet another example, a numerical range with upper and lower bounds defined at different levels of precision shall be interpreted in increments corresponding to the bound with the higher level of precision. For example, a numerical percentage range from 30.92% to 47.4% (i.e., levels of precision in units or increments of hundredths and tenths, respectively) encompasses (in %) a set of [30.92, 30.93, 30.94, . . . , 47.39, 47.40], as if 47.4% (tenths) was recited as 47.40% (hundredths) and as if the intervening numbers between 30.92 and 47.40 in units or increments of hundredths were expressly disclosed.

It will be appreciated that the level of precision of any particular measurement, threshold or other inexact parameter may vary based on various factors such as measurement instrumentation, environmental conditions, and so on. Below, reference to such measurements or thresholds may thereby be interpreted as a respective value assuming a pseudo-exact level of precision (e.g., a threshold of 80% comprises 80.0000 . . . %). Alternatively, reference to such measurements or thresholds may be described via a qualifier that captures pseudo-exact value(s) plus a range that extends above and/or below the pseudo-exact value(s). For example, the above-noted threshold of 80% may be interpreted as "about", "approximately", "around" or "—" 80%, which encompasses "exactly" 80% (e.g., 80.0000 . . . %) plus some range around 80%. In some designs, the range encompassed around a measurement or threshold via the "about", "approximately", "around" or "—" qualifier may encompass the level of precision for which the respective measurement or threshold is capable of being measured by the most accurate commercially available instrumentation as of the priority date of the subject application.

In some embodiments described below, certain parameters (e.g., temperature, state-of-charge (SOC), etc.) may be defined in terms of relative terminology such as low, reduced, high, increased, elevated, and so on. With regard to temperature, unless otherwise stated, this relative terminology may be characterized relative to battery cell storage temperature or battery cell operating temperature, depending on the context of the relevant example. With regard to SOC, unless otherwise stated, a high SOC may be defined as higher than about 70% SOC (e.g., in some designs, about 70-80% SOC; in some designs, about 80-90% SOC; in some designs, about 90-100% SOC).

Polymer particles (e.g., nanospheres and microspheres) have a broad range of applications, such as for use in medicine and pharmaceuticals, as starting materials for various composites and nanocomposites (including, but not limited to various polymer-metal, polymer-semimetal, polymer-metal oxide, polymer-metal carbide, polymer-semimetal oxide, polymer-semimetal carbide, polymer-metal (or semimetal) fluoride, polymer-metal (or semimetal) nitride, polymer-metal (or semimetal) hydride, polymer-chalcogen, polymer-metal (or semimetal) sulfide, polymer-metal (or semimetal) selenide, various carbon-metal, carbon-semimetal, carbon-metal oxide, carbon-semimetal oxide, carbon-metal (or semimetal) carbide, carbon-metal (or semimetal) fluoride, carbon-metal (or semimetal) nitride, carbon-metal (or semimetal) hydride, carbon-chalcogen, carbon-metal (or semimetal) sulfide, carbon-metal (or semimetal) selenide, among others and their various combinations), carbon materials (including but not limited to porous carbon materials).

Polymer and polymer-derived particles may be used in filtration, adsorption, absorption, and separation processes, in energy storage and conversion applications (e.g., supercapacitors, batteries, hybrid and other energy storage devices, fuel cells and other energy conversion applications), in desalination, catalytical chemical synthesis or chemical conversion processes, $CO_2$ capture and conversion, and for enhancement of various mechanical properties, and other properties. In some designs, polymer particles may be processed as droplets or an emulsion, and then cooled to form solid polymer particles.

When describing applications of polymer and polymer-derived particles for electrochemical energy storage device applications, the description below may describe certain examples in the context of Li metal and Li-ion batteries (for brevity and convenience, and because of the current popularity of Li technology). However, it will be appreciated that various aspects may be applicable to other rechargeable and primary batteries (such as Na metal and Na-ion, Mg metal and Mg-ion, K metal and K-ion, Ca metal and Ca-ion and other metal and metal-ion batteries, alkaline batteries with OH-ions, mixed ion batteries, etc.) as well as electrochemical capacitors or hybrid devices (e.g., with one electrode being battery-like and another electrode being electrochemical capacitor-like).

Further, while the description below may also describe certain examples of the active electrode material belonging to so-called conversion-type active material(s) (including so-called alloying type active materials, true conversion-type active materials, chemical transformation-type active materials, metal active material, etc.), it will be appreciated that various aspects may be applicable to so-called intercalation-type active material(s), so-called pseudocapacitive active materials, as well as mixed type active materials (or components of active materials) that may store charge by more than one mechanism (e.g., active materials that exhibit both intercalation and conversion-type electrochemical reactions during cell operation, among many other combinations).

Further, while the description below may also describe certain examples of active (reversibly ion-storing) materials (as component(s) of the (nano)composites) in the form of crystalline (or nanocrystalline) materials, it will be appreciated that various aspects may be applicable to highly disordered or amorphous active materials.

Further, while the description below may also describe certain examples of polymer particles or polymer-derived particles or porous particles or composite particles having spherical or spheroidal three dimensional (3D) shape, it will be appreciated that various aspects may be applicable to particles having other shapes, including, for example, irregular shapes, elongated two-dimensional (2D, such as (nano)composite platelets or porous carbon sheets, etc.)

shapes or one dimensional (1D, such as, for example, (nano)composite nanofibers and fibers or porous carbon nanofibers and fibers, etc.) shapes.

While the description below may describe certain embodiments in the context of improved battery electrodes or improved battery cells, it will be appreciated that improved battery modules or packs may be enabled with different aspects of the disclosed technologies. Such modules or packs, for example, may be smaller, lighter, safer, simpler, less expensive, provide more energy, provide higher power, provide longer cycle life, provide longer calendar life, provide better operation at low temperatures, provide better operation at high temperatures and other important features. It will similarly be appreciated that improved electronic devices, improved electric scooters, electric bicycles, electric cars, electric trucks, electric buses, electric ships, electric planes and, more broadly, improved electric and hybrid electric ground, sea, and aerial (flying) vehicles (including heavy vehicles, autonomous vehicles, unmanned vehicles, planes, space vehicles, satellites, submarines, etc.), improved robots, improved stationary home or stationary utility energy storage units and improved other end products may be enabled with different aspects of the disclosed technologies. Such devices may be smaller, lighter, offer longer range, faster charging, faster acceleration, better operation at different temperatures, lower cost, longer calendar life, slower degradation with repeated charging and discharging, better safety, etc.

While the description below may also describe certain examples of the material formulations in a Li-free state (for example, as in silicon-comprising nanocomposite anodes or metal fluoride cathodes), it will be appreciated that various aspects may be applicable to Li-containing electrodes and active materials (for example, partially or fully lithiated Si-comprising anodes or partially or fully lithiated Si-comprising anode particles, partially or fully lithiated metal fluoride comprising cathodes (such as a mixture of LiF and metals such as Cu, Fe, Ni, Bi, and various other metals and metal alloys and mixtures of such and other metals, etc.) or partially or fully lithiated metal halide comprising cathode particles, partially or fully lithiated chalcogenides (such as $Li_2S$, $Li_2S$/metal mixtures, $Li_2Se$, $Li_2Se$/metal mixtures, $Li_2S$—$Li_2Se$ mixtures, various other compositions comprising lithiated chalcogenides etc.), partially or fully lithiated metal oxides (such as $Li_2O$, $Li_2O$/metal mixtures, etc.), partially or fully lithiated carbons, among others). In some designs, various material properties (e.g., at particle level, at inter-particle level, at electrode level, etc.) may change based on whether active material particle(s) are in a Li-free state, a partially lithiated state, or a fully lithiated state. Such Li-dependent material properties may include particle pore volume, electrode pore volume, and so on. Below, unless stated or implied otherwise, reference to such Li-dependent material properties (e.g., at particle level, at inter-particle level, at electrode level, etc.) may be assumed to be provided as if the active material particles are in the Li-free state.

FIG. 1A illustrates a polymer particle droplet 100 in accordance with an aspect of the disclosure. The polymer particle droplet 100 depicted in FIG. 1A is a representation of a droplet phase (e.g., a liquid or semiliquid phase), which may be initially formed during polymerization of furfuryl alcohol into polyfurfuryl alcohol (or pFA). Along the periphery (or surface) of the polymer particle droplet 100, an alkylbenzene sulfonic acid 110 (dodecylbenzene sulfonic acid, in this illustrative example) may act as both a surfactant to stabilize the droplet and an acid (e.g., proton from sulfonic acid group in one illustrating example) to catalyze the polymerization reaction. Long chain polymers 120, shown in FIG. 1A as looping in and out of the periphery (or surface) of the polymer particle 100, may act as a stabilizing compound (which may alternatively be referred to as a "stabilizer" compound), which in this illustrative example is polyvinyl alcohol. Inside the polymer particle droplet 100, oligomers of pFA grow and cross-link as the polymer particle droplet 100 cools and solidifies to form a polyfurfuryl alcohol resin. As will be described below in more detail, various techniques may be used to control (or fine-tune) various properties of such polymer particle droplets, including but not limited to their size (e.g., diameter or radius in case of spherical or near-spherical particles), composition, and so on. As used here, reference to a polymer particle may refer either to a polymer particle droplet or a solid polymer particle.

Figure 1B:
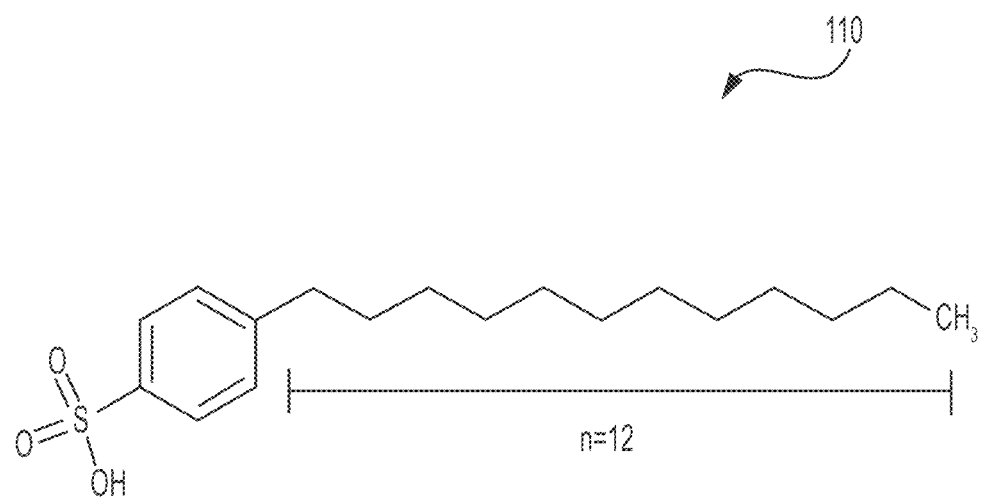
FIG. 1B illustrates the structure of an alkylbenzene sulfonic acid in accordance with an aspect of the disclosure.

FIG. 1B illustrates the structure of an alkylbenzene sulfonic acid, such as the alkylbenzene sulfonic acid 110 of FIG. 1B, with an aliphatic, the carbon chain attached to carbon number 4 position on the benzene ring consisting of 12 carbons in accordance with an aspect of the disclosure.

In some designs, polymer particles comprising polyfurfuryl alcohol as described herein may have a chemical composition by weight % of about 50 wt. % to about 80 wt. % carbon, about 3 wt. % to about 7 wt. % hydrogen, and about 10 wt. % to about 40 wt. % oxygen. In some designs, the chemical composition may be tuned according to the state of cure of the polyfurfuryl alcohol polymer. For example, polyfurfuryl alcohol polymer particles with a glass transition temperature of about 80° C. may have a carbon hydrogen and oxygen composition that differs from polymer particles with a glass transition temperature of about 200° C., and may likewise differ from polymer particles that are a fully cross-linked resin and do not have a glass transition temperature. Other elements may also be made part of the polymer particles, such as impurities in the polyfurfuryl alcohol product (e.g., sulfur, phosphorus, sodium, etc., but the impurities are not limited to these specific elements).

In an aspect of the disclosure, polymer particles comprising polyfurfuryl alcohol as described herein may be configured as spherical, near-spherical, and spheroidal (including but not limited to oblate spheroid-shaped) particles. Furthermore, in some designs, the polymer particles may be configured as fully individualized particles (e.g., not chemically bonded to, adhered to, or otherwise agglomerated with other polymer particles). However, depending on the desired outcome of the polymer, agglomerates of some or all of the polymer particles may also be formed (e.g., due to some polymer particle droplets being in contact with each other during the cooling phase).

In an aspect of the disclosure, polymer particles comprising polyfurfuryl alcohol as described herein may have a minimum glass transition temperature of about 20° C., as measured by differential scanning calorimetry (DSC). In some designs, the glass transition temperature can be increased using temperature treatments, hydrothermal treatment, and/or catalysts (for example as Bronsted acids, Lewis acids, anhydrides, amines, dienes, and dicarboxylic acids, among others) and can also be varied by the addition of compounds that participate in Diels-Alder type reactions. Furthermore, in some designs as noted above, the polymer particles may exist in a state with no detectable glass transition temperature, which is consistent with a fully cross-linked resin state, or a state in which oligomers comprising polyfurfuryl alcohol are too short to exhibit a glass transition temperature.

In an aspect of the disclosure, polymer particles comprising polyfurfuryl alcohol as described herein may have a median value for particle size (e.g., volume-based particle size in cases of non-spherical particles) distributions that can range from about 100 nanometers to about 100 micron. In some designs and applications, it may be advantageous for the median value for the particle size to range from about 1 micron to about 25 micron. In some designs, it may be advantageous for the weight-average value for the particle size to range from about 1 micron to about 25 micron. In some designs, polymer particles comprising polyfurfuryl alcohol may have a percent coefficient of variation (e.g., the standard deviation divided by the mean particle size, of a given particle size distribution of polyfurfuryl alcohol particles) for particle size distribution that vary from about 2% to about 1000%. Furthermore, in some designs, polymer particles comprising polyfurfuryl alcohol may exist as several different modalities. In one example, a single modal particle size distribution of polymer particles comprising polyfurfuryl alcohol is produced by process 200 of fabricating polymer particles comprising polyfurfuryl alcohol. In another example, a bimodal particle size distribution of polymer particles comprising polyfurfuryl alcohol is produced by process 200 of fabricating polymer particles comprising polyfurfuryl alcohol. In another example, a trimodal particle size distribution of polymer particles comprising polyfurfuryl alcohol is produced by process 200 of fabricating polymer particles comprising polyfurfuryl alcohol. In another example, two separate batches of particles comprising polyfurfuryl alcohol produced by process 200 of fabricating polymer particles comprising polyfurfuryl alcohol are combined to modify (e.g., increase or decrease) the coefficient of variation. In another example, three separate batches of particles comprising polyfurfuryl alcohol produced by process 200 of fabricating polymer particles comprising polyfurfuryl alcohol are combined to modify (e.g., increase or decrease) the coefficient of variation.

In an aspect of the disclosure, polymer particles comprising polyfurfuryl alcohol as described herein may have a density ranging from about 0.8 grams per cubic centimeter ($g/cm^3$) to 1.5 $g/cm^3$, as measured by helium pycnometry. Furthermore, in some designs, the water content in the polymer particles comprising polyfurfuryl alcohol may vary from about 0 wt. % to about 40 wt. % of the polymer particles, and the volatile organic content comprising, for example, furfuryl alcohol, furfural, acetic acid, acetone, tetrahydrofurfuryl alcohol, 4,5-Dihydro-2-furancarbaldehyde, 4,5-Dihydro-2-furanylmethanol, 2-(2-furfuryl)furan, among others may vary from about 0 wt. % to 20 wt. % of the total polymer particles' weight.

In an aspect of the disclosure, polymer particles comprising polyfurfuryl alcohol as described herein may have a total pore volume ranging from about 0.00 cubic centimeters per gram ($cm^3/g$) to about 0.30 $cm^3/g$ and a specific surface area (SSA) ranging from about 0.1 meters squared per gram ($m^2/g$) to about 200 $m^2/g$, as measured by nitrogen gas adsorption method (Brunauer-Emmett-Teller or BET). In some designs, the BET SSA of such particles may range from about 1 to about 20 $m^2/g$.

Another aspect of the disclosure is directed to a synthesis process that allows for control of polymer particle size and particle size distributions, which is useful for many applications. For example, when polymer particles with controlled particle size distributions are processed at elevated temperatures (e.g., via pyrolysis and/or chemical or physical activation and/or other chemical reactions), the polymer particles may become at least partially carbonized (e.g., transformed into mostly $sp^2$-bonded carbon particles). In some designs, such carbon (or carbon-dominant) materials may exhibit controlled particle size distributions that reflect the initial parent polymer material. In some designs, the produced carbon (or carbon-dominant) material may be porous. In some designs, thus produced porous carbons may be further treated (e.g., by chemical or physical activation) to further increase pore volume. In some designs, thus produced porous carbons may be further chemically modified or infiltrated with other functional materials. In some designs, a process that produces carbon materials with controlled particle size distributions on the micron and nano scale may be utilized in many applications such as, for example, energy storage (e.g., porous carbons for use in double-layer capacitors or electrochemical supercapacitors or hybrid energy storage devices; electrodes for various battery chemistries, such as graphite or carbon-containing materials for use in anodes or cathodes in intercalation-type or conversion-type or mixed type lithium-ion, lithium metal, sodium-ion, sodium metal, and other metal-ion/metal batteries and other batteries, to name a few), energy conversion (e.g., porous carbons for use in fuel cells); gas storage at sub-atmospheric, atmospheric and elevated pressures (e.g., storage of hydrogen, natural gas, chlorine, semiconductor precursors, etc.), separation or purification, $CO_2$ capture, $CO_2$ conversion (including, but not limited to electrochemical conversion processes), water filtration and purification, additives in polymer chemistry, medical and biomedical applications, volatile organic capturing and recovery, color removal in the food and beverage industry, catalyst and catalyst support for chemical or electrochemical processes, composite materials for the discussed above and other applications, among others. In case when the produced porous carbons are chemically modified or infiltrated with other functional materials thus producing carbon-containing composites (e.g., for energy storage or energy conversion applications or for gas storage, separation or capture or for chemical transformation, etc.), such composites may additionally comprise one, two, three or more of the following elements in some designs: H, Li, Na, Mg, K, Ca, Ti, V, Cr, Mn, Fe, Co, Ni, Cu, Zn, B, N, O, F, Al, Si, P, S, Se, Te, Cl, Br, I, Ga, Ge, As, Y, Zr, Nb, Mo, Ru, Rh, Pd, Ag, In, Sn, Sb, Cs, Ba, Hf, Ta, W, Re, Os, Ir, Pt, Pb, Bi. The atomic fraction of these elements may range from about 0.01 at. % to about 90.00 at. % as a fraction of all elements in the carbon-containing composite particle. in some designs, such elements may exist in the form of the pure or doped compounds, alloys, oxides, carbides, nitrides, sulfides, selenides, nitrides, fluorides, among other compositions and their various mixtures. In some designs, such composites may additionally comprise surface coatings or shells. In some designs, such coatings or shells may resist penetration of moisture or oxygen in the core of the composite particles. In some designs, such coatings or shells may comprise carbon. In some designs, the fraction of carbon in the coatings or shells may range from about 50 at. % to about 100 at. %. In some designs, the thickness of such coatings or shells may range from about 0.3 nm to about 30 nm.

Furthermore, this bottom-up approach to forming nano-sized and/or micronized polymer particles and converting them to carbon products via thermal processing may reduce or eliminate additional processing stages that would otherwise be required to control particle size distributions, such as milling, classification, and/or sieving. Therefore, in some designs, the need for additional particle size distribution control processes may be reduced or even eliminated, which has other advantages such as reducing or eliminating a costly process stage, increasing throughput, and reducing or eliminating source(s) of impurities from milling processes, which can impact subsequent uses in many applications.

Another aspect of the disclosure is directed to a synthesis process that produces high purity polymer materials (e.g., polymers that contain low concentrations of elements other than carbon, hydrogen, and oxygen), which may be useful across many applications that require high purity carbon materials. For example, in some designs, the synthesis process in accordance with one or more aspects of the disclosure may produce polyfurfuryl alcohol polymer particles that are at least about 99.900 wt. % (in some designs at least above 99.990 wt. %) comprised of carbon, hydrogen, and oxygen. In some designs, the synthesis process in accordance with one or more aspects of the disclosure may produce polyfurfuryl alcohol polymer particles that are at least about 99.999 wt. % carbon, hydrogen, and oxygen. In some designs, the synthesis process in accordance with one or more aspects of the disclosure may produce polyfurfuryl alcohol polymer particles that are at least about 99.000 wt. % carbon, hydrogen, and oxygen. In some designs, the synthesis process in accordance with one or more aspects of the disclosure may produce polyfurfuryl alcohol polymer particles that are at least about 95.000 wt. % carbon, hydrogen, and oxygen. In some designs, the synthesis process in accordance with one or more aspects of the disclosure may produce polyfurfuryl alcohol polymer particles that are at least about 90.000 wt. % carbon, hydrogen, and oxygen. In some designs, high purity polymer particles (e.g., polymers that contain low concentrations of elements other than carbon and hydrogen, and oxygen) that are thermally processed (e.g., pyrolysis and activation) may produce high purity carbon materials. Such carbon materials may be further used in composition-sensitive application such as, for example, energy storage (double-layer capacitors, electrochemical supercapacitors, hybrid energy storage devices; intercalation-type or conversion-type or mixed type lithium-ion or lithium metal, sodium-ion or sodium metal and other metal, metal-ion and other batteries, to name a few), energy conversion (e.g., fuel cells); gas storage at sub-atmospheric, atmospheric and elevated pressures, gas separation or purification, $CO_2$ capture, $CO_2$ conversion, water filtration and purification, additives in polymer chemistry, medical and biomedical applications, volatile organic capturing and recovery, color removal in the food and beverage industry, catalyst and catalyst support for chemical or electrochemical processes, composite materials for the discussed above and other applications, among others.

Aspects of the disclosure are related to fabrication of spherical, near-spherical, and/or spheroidal polymer particles that comprise polyfurfuryl alcohol. For example, at a high-level, a Lewis or Bronsted acid catalyst initiator may be added to a mixture of an aqueous solution (e.g., water), furfuryl alcohol, and stabilizer compound(s) and allowed to react and form polymer particles (e.g., spheres) that comprise polyfurfuryl alcohol. In some examples, the Lewis or Bronsted acid catalyst initiator may be added to a solution of furfuryl alcohol, a stabilizer compound, and an aqueous solution (e.g., water) while arranged as a homogenous mixture or solution, while in other examples the Lewis or Bronsted acid catalyst initiator may be added to a solution of furfuryl alcohol, a stabilizing compound, and an aqueous solution (e.g., water) while arranged as a heterogeneous mixture or solution. In some examples, the Lewis or Bronsted acid catalyst may be added as a mixture of water and Lewis or Bronsted acid catalyst, while in other examples it may be added as a neat chemical. Such aspects are described in more detail below with respect to FIG. 2.

Figure 2:
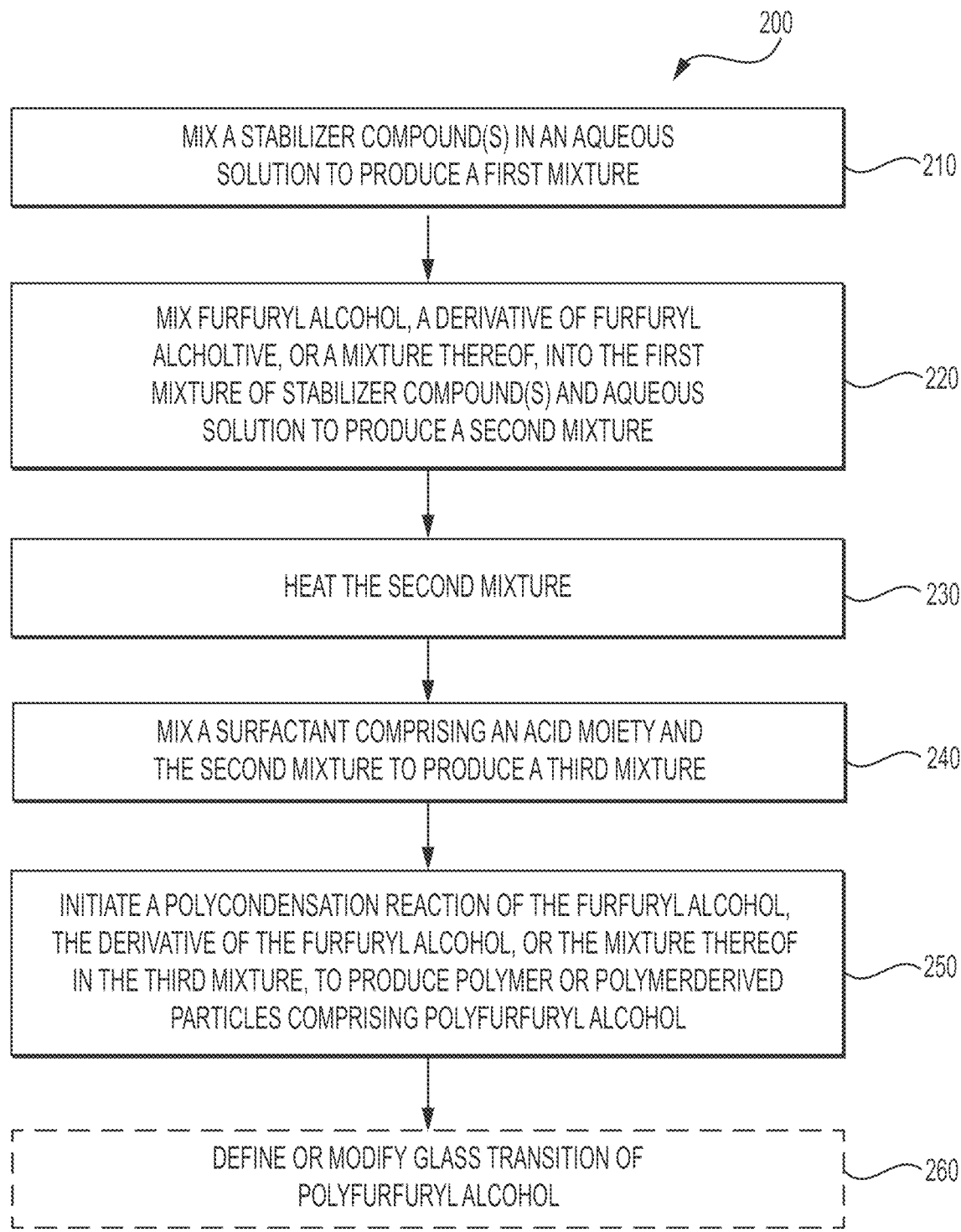
FIG. 2 illustrates a process of fabricating polymer particles comprising polyfurfuryl alcohol in accordance with an aspect of the disclosure.

FIG. 2 illustrates an example process 200 of fabricating polymer particles comprising polyfurfuryl alcohol in accordance with an aspect of the disclosure.

Referring to FIG. 2, at stage 210, one or more stabilizer compounds may be mixed (e.g., dissolved or dispersed) with an aqueous or water-comprising solution to form a first mixture (e.g., where the stabilizer compound(s) are dissolved or suspended in the aqueous solution). In some designs, the first mixture may comprise one or more stabilizer compounds at a concentration of about 0.0001 wt. % to about 50.0000 wt. % of the first mixture. In some designs, at stage 210, the stabilizer compound or mixture of stabilizer compounds may be dissolved in water at temperatures in the range of about 1° C. to about 100° C., a pressure in the range of about 0.1 to about 10 bar (in some designs, around 1 bar), a pH ranging from about 2 to about 12, while stirring. Stirring conditions, such as mixing speeds, impeller design, inclusion of baffles, may be varied to reduce or prevent settling of the stabilizing compound(s), and/or to improve dissolution of stabilizing compound(s) to form the aqueous solution. Depending on the agitation design, the agitation conditions, the process temperature, and the stabilizer compound, the dissolution process may take anywhere between about 1 minute to about 72 hours, but may take longer. In some designs, the stabilizer compound(s) may be suitable for stabilizing a polymer material such as polyfurfuryl alcohol. In some designs, examples of suitable stabilizer compounds include polyvinylpyrrolidone, polyvinyl alcohol, tri-block copolymer(s) derived from polypropylene and polyethylene, gum acacia, polyvinyl acetate, polyacrylonitrile, and/or others, or a combination thereof. In the case of multiple stabilizer compounds, in some designs, each of the multiple stabilizer compounds may be dissolved in the aqueous solution at stage 210. In other designs, each of the multiple stabilizer compounds may be suspended in the aqueous solution at stage 210. In other designs, some of the multiple stabilizer compounds may be suspended in the aqueous solution at stage 210 while other of the multiple stabilizer compounds may be dissolved in the aqueous solution at stage 210.

Referring to FIG. 2, at stage 220, furfuryl alcohol, a derivative of furfuryl alcohol, or a mixture thereof, may be mixed (e.g., dissolved) into the first mixture of aqueous solution and stabilizer compound(s) to produce a second mixture. In some designs, the second mixture may comprise the furfuryl alcohol, the derivative of furfuryl alcohol, or the mixture thereof, at a concentration of about 0.0001 wt. % to about 80.0000 wt. % of the second mixture. In some designs, the mixing of stage 220 may occur quite quickly (e.g., a few seconds) as both the furfuryl alcohol, the derivative of furfuryl alcohol, or the mixture thereof, and the first mixture may be configured as miscible liquids. In some designs, the second mixture may comprise a homogeneous solution of furfuryl alcohol, the derivative of furfuryl alcohol, or the mixture thereof, stabilizer compound(s), and the aqueous solution. In other designs, the second mixture may comprise a heterogeneous solution of furfuryl alcohol, the derivative of furfuryl alcohol, or the mixture thereof, stabilizer compound(s), and the aqueous solution with an aqueous phase and a hydrophobic emulsion phase. In some designs, the homogeneity or heterogeneity of the second mixture may be controlled based on various parameters, including mixing temperature (e.g., higher temperatures can be correlated with more homogeneity, while lower temperatures can be correlated with more heterogeneity), a quality or purity of the furfuryl alcohol, the derivative of furfuryl alcohol, or the mixture thereof (e.g., ascertainable via gas chromatograph and/or cloudpoint of the furfuryl alcohol), and/or an amount or type of stabilizing compound(s). The degree of homogeneity or heterogeneity may in turn be a tuning parameter to control the particle size (or particle size distribution) of the polymer particle droplets.

Referring to FIG. 2, at stage 220, in some designs, derivative(s) of furfuryl alcohol may be mixed (e.g., dissolved) into the first mixture of aqueous solution and stabilizer compound(s) to produce the second mixture. Derivatives of furfuryl alcohol may include, for example, oligomers of polyfurfuryl alcohol, for example polyfurfuryl alcohol with a degree of polymerization of 2, for example polyfurfuryl alcohol with a degree of polymerization of 3, for example polyfurfuryl alcohol with a degree of polymerization of 4, for example polyfurfuryl alcohol with a degree of polymerization of 5, for example polyfurfuryl alcohol with a degree of polymerization of 6, for example polyfurfuryl alcohol with a degree of polymerization of 7, for example polyfurfuryl alcohol with a degree of polymerization of 8, for example polyfurfuryl alcohol with a degree of polymerization of 9, for example polyfurfuryl alcohol with a degree of polymerization of 10. Derivatives of furfuryl alcohol may also include, for example, furfuryl acetate, furfuryl propionate, furfuryl 3-methyl-butanoate, or furfuryl pentanoate, or 2-furoic acid. In some designs, the second mixture may comprise the furfuryl alcohol derivatives at a concentration of about 0.0001 wt. % to about 80.0000 wt. % of the second mixture. In some designs, a mixture of furfuryl alcohol derivatives may comprise the furfuryl alcohol derivatives at a concentration of about 0.0001 wt. % to about 80.0000 wt. % of the second mixture. In some designs, a mixture of furfuryl alcohol and furfuryl alcohol derivative(s) may comprise the furfuryl alcohol and furfuryl alcohol derivative(s) at a concentration of about 0.0001 wt. % to about 80.0000 wt. % of the second mixture. In some designs, derivatives of furfuryl alcohol may comprise co-monomers.

In some designs, at stage 220, the furfuryl alcohol, the derivative of furfuryl alcohol, or the mixture thereof, may be added while the first mixture is at a temperature between about 25° C. and 90° C. In some designs, at stage 220, the furfuryl alcohol, the derivative of furfuryl alcohol, or the mixture thereof, may be heated to a temperature between about 25° C. and 90° C., and then added to the first mixture.

Referring to FIG. 2, at stage 230, the second mixture (e.g., homogenous or heterogenous solution) of furfuryl alcohol, a derivative of furfuryl alcohol, or a mixture thereof, stabilizer compound(s), and aqueous solution may then be heated. For example, the second mixture may be heated from a starting temperature between about 25° C. and about 90° C. to a final temperature between about 30° C. and about 100° C. In some examples, there may be a phase change that occurs during the heating stage at stage 230 that changes a homogenous mixture of furfuryl alcohol, the derivative of furfuryl alcohol, or the mixture thereof, stabilizer compound(s), and aqueous solution into a heterogenous mixture (e.g., liquid mixture) with an aqueous phase and a hydrophobic emulsion phase, and likewise the opposite may occur when a heterogenous mixture (e.g., liquid mixture) with an aqueous phase and a hydrophobic emulsion phase may become a homogeneous one-phase mixture comprising furfuryl alcohol, the derivative of furfuryl alcohol, or the mixture thereof, stabilizer compound(s), and aqueous solution.

Referring to FIG. 2, in some designs, at stage 240, at the start of the initiation phase, a surfactant comprising an acid moiety (e.g., an alkylbenzene sulfonic acid, a Bronsted acid, a Lewis acid, HCl, $H_2SO_4$, phosphoric acids, carboxylic acids, ionic liquids functionalized with sulfonic acid groups, etc.) may be mixed with the second mixture of aqueous solution, stabilizer compound(s), and furfuryl alcohol the derivative of furfuryl alcohol, or the mixture thereof, to produce a third mixture. In some designs, the surfactant (e.g., alkylbenzene sulfonic acid) may be mixed into the second mixture, while in other designs, the second mixture may be mixed into the surfactant (e.g., alkylbenzene sulfonic acid). For example, a liquid or semiliquid alkylbenzene sulfonic acid may be mixed into the second mixture of aqueous solution, stabilizer compound(s), and furfuryl alcohol the derivative of furfuryl alcohol, or the mixture thereof (or vice versa) to produce a third mixture. In some designs, at stage 240, a solid alkylbenzene sulfonic acid may be mixed into the second mixture of aqueous solution, stabilizer compound(s), and furfuryl alcohol the derivative of furfuryl alcohol, or the mixture thereof (or vice versa) to produce a third mixture. In some designs, the third mixture comprises the surfactant (e.g, alkylbenzene sulfonic acid) at a concentration of about 0.001 wt. % to about 30.000 wt. %. In some designs, the surfactant (e.g., alkylbenzene sulfonic acid) may be added to the reaction vessel as quickly as possible. In some designs, the surfactant (e.g., alkylbenzene sulfonic acid) may be added gradually over the course of about 1 hour. In a flow reactor design, the surfactant (e.g., alkylbenzene sulfonic acid) and the second solution may be added continuously to the flow reactor throughout the course of the reaction. In some examples, the surfactant (e.g., alkylbenzene sulfonic acid) may be added to the mixture of aqueous solution, stabilizer compound(s), and furfuryl alcohol the derivative of furfuryl alcohol, or the mixture thereof, as a neat liquid; in other examples, the surfactant (e.g., alkylbenzene sulfonic acid) may be added as an aqueous solution comprising about 0.01 wt. % to about 99 wt. % of the surfactant (e.g., alkylbenzene sulfonic acid) in an aqueous solution (e.g., water). Furthermore, in some examples the neat liquid, solid, or aqueous solution of the surfactant (e.g., alkylbenzene sulfonic acid) may pre-heated to match the mixture (e.g., solution) of the furfuryl alcohol, the derivative of furfuryl alcohol, or the mixture thereof, stabilizer compound(s) and water solution during addition; in other examples the neat liquid, solid, or aqueous solution of the surfactant (e.g., alkylbenzene sulfonic acid) may be pre-heated to exceed the mixture (e.g., solution) of the furfuryl alcohol, the derivative of furfuryl alcohol, or the mixture thereof, stabilizer compound(s), and aqueous solution during addition; in other examples the neat liquid, solid, or aqueous solution of the surfactant (e.g., alkylbenzene (e.g., 4-dodecylbenzene) sulfonic acid) may be cooled to a temperature below the solution temperature of the furfuryl alcohol, the derivative of furfuryl alcohol, or the mixture thereof, stabilizer compound(s) and aqueous solution for the addition at stage 240. For example, the temperature of the surfactant (e.g., alkylbenzene sulfonic acid) may be tuned to achieve a target temperature of the third mixture after the surfactant (e.g., alkylbenzene sulfonic acid) and the second mixture may be mixed together at stage 240 (e.g., which may eventually affect polymerization, particle size, etc. at stage 250, described below in more detail).

Referring to FIG. 2, in some designs, the surfactant (e.g., alkylbenzene sulfonic acid) added at stage 240 in FIG. 2 may have an aliphatic carbon chain attached to carbon number 4 (e.g., the para-carbon position relative to the sulfonic acid group on the benzene ring) that includes an average distribution from about 9-14 carbons; in other examples, the carbon chain attached to carbon number 4 position on the benzene ring may include an average of 9-10 carbons; in other examples, the carbon chain attached to carbon number 4 position on the benzene ring may include an average of 10-11 carbons; in other examples, the carbon chain attached to carbon number 4 position on the benzene ring may include an average of 11-12 carbons; in other examples, the carbon chain attached to carbon number 4 position on the benzene ring may include an average of 12-13 carbons; in other examples, the carbon chain attached to carbon number 4 position on the benzene ring may include an average of 13-14 carbons. Additionally, in some examples, the aliphatic carbon chain attached to the carbon number 4 position on the benzene ring may be arranged as a straight aliphatic hydrocarbon chain comprising primary and secondary carbon atoms, in some examples. In some designs, the aliphatic hydrocarbon chain attached to the carbon number 4 position on the benzene ring may be arranged as a branched hydrocarbon chain comprising primary, secondary, tertiary and/or quaternary carbon atoms.

Referring to FIG. 2, in some designs, the surfactant (e.g., alkylbenzene sulfonic acid) added at stage 240 in FIG. 2 may have an aliphatic carbon chain attached to carbon number 2 (e.g., the ortho-carbon position relative to the sulfonic acid group on the benzene ring) that includes an average distribution from about 9-14 carbons; in other examples, the carbon chain attached to carbon number 2 position on the benzene ring may include an average of 9-10 carbons; in other examples, the carbon chain attached to carbon number 2 position on the benzene ring may include an average of 10-11 carbons; in other examples, the carbon chain attached to carbon number 2 position on the benzene ring may include an average of 11-12 carbons; in other examples, the carbon chain attached to carbon number 2 position on the benzene ring may include an average of 12-13 carbons; in other examples, the carbon chain attached to carbon number 2 position on the benzene ring may include an average of 13-14 carbons. Additionally, in some examples, the aliphatic carbon chain attached to the carbon number 2 position on the benzene ring may be arranged as a straight aliphatic hydrocarbon chain comprising primary and secondary carbon atoms, in some examples. In some designs, the aliphatic hydrocarbon chain attached to the carbon number 2 position on the benzene ring may be arranged as a branched hydrocarbon chain comprising primary, secondary, tertiary and/or quaternary carbon atoms.

Referring to FIG. 2, in some designs, the aliphatic carbon chain of the surfactant (e.g., alkylbenzene sulfonic acid) may be an important property of the acid initiator that may lead to different particle size distributions. For example, in case of alkylbenzene sulfonic acid, the alkylbenzene sulfonic acid compounds do not commonly exist as 100% pure compounds, but as distributions of alkylbenzene sulfonic acids with different numbers of carbons attached to carbon position number 4, which yields an alkylbenzene sulfonic acid compound with an average carbon chain length. For example, an alkylbenzene sulfonic acid initiator with an average of 11.3 carbons comprising the aliphatic carbon tail at position 4 produced a final polyfurfuryl alcohol polymer product with a median particle size value of 2.20 micron following the process described in FIG. 2. In another example, an alkylbenzene sulfonic acid initiator with an average of 12.6 carbons comprising the aliphatic carbon tail at position 4 produced a final polyfurfuryl alcohol polymer product with a median particle size value of 4.6 micron following the process described in FIG. 2.

Referring to FIG. 2, in some designs, the mixing at stage 240 to prepare the third mixture may be an important aspect of the polymerization process that may impact final end products, such as particle size distributions. In some examples, if the surfactant (e.g., alkylbenzene sulfonic acid) is not evenly mixed in the liquid in the reaction vessel, this may result in a higher percentage coefficient of variations. In other examples, if the surfactant (e.g., alkylbenzene sulfonic acid) solution is evenly mixed in the liquid in the reaction vessel, this may result in a lower percentage coefficient of variations.

Referring to FIG. 2, at stage 250, a polycondensation reaction of the furfuryl alcohol, the derivative of the furfuryl alcohol, or the mixture thereof, in the third mixture is initiated to produce polymer (or polymer-derived) particles comprising polyfurfuryl alcohol. For example, at stage 250, the furfuryl alcohol, the derivative of furfuryl alcohol, or the mixture thereof, of the third mixture from 240 may be polymerized to produce polymer particles (e.g., initially, in the form of droplets in a liquid phase or semiliquid phase) that comprise polyfurfuryl alcohol. For example, the acid properties of the surfactant (e.g., alkylbenzene sulfonic acid) may act to initiate the polymerization of the furfuryl alcohol, the derivative of the furfuryl alcohol, or the mixture thereof, into polyfurfuryl alcohol (e.g., directly after addition of the alkylbenzene sulfonic acid to the third mixture). For example, as the furfuryl alcohol monomers continue to react through polycondensation reactions and polyfurfuryl alcohol polymers continue to grow and cross-link, the droplet phase of the reaction may be formed, which includes a hydrophobic polyfurfuryl alcohol phase suspended in an aqueous phase. At this point, as an example, the surfactant (e.g., alkylbenzene sulfonic acid) initiator may be acting as both the acid catalyst and as a surfactant stabilizer. In a further example, in case of alkylbenzene sulfonic acid, the acid and surfactant properties of the alkylbenzene sulfonic acid may act together during the reaction to allow the formation of polyfurfuryl alcohol of spherical shape, near spherical shape, spheroidal shape, or a combination thereof. For example, the strong acid properties may polymerize the furfuryl alcohol, the derivative of furfuryl alcohol, or the mixture thereof, into polyfurfuryl alcohol, which, in case of alkylbenzene sulfonic acid, then may form a hydrophobic polyfurfuryl alcohol droplet emulsion phase that may also be stabilized by the alkylbenzene sulfonic acid, which is also a strong surfactant stabilizer. For example, the surfactant stabilizing properties of the alkylbenzene sulfonic acid may act to reduce or minimize the energy required for the emulsion droplet formation by reducing interfacial tension between the hydrophobic phase, which may contain polyfurfuryl alcohol, and the aqueous phase. For example, the surfactant stabilizing properties of the alkylbenzene sulfonic acid may act to provide coverage around droplet phase at the hydrophobic/aqueous phase interface by reducing or preventing coalescence or agglomeration with other droplet phases through electrostatic repulsion or steric hindrance.

Referring to FIG. 2, in some examples, an emulsion, which may include a hydrophobic polyfurfuryl alcohol phase suspended in an aqueous phase, may already be formed prior to the addition of the surfactant (e.g., alkylbenzene sulfonic acid) at stage 240, which may then act to polymerize furfuryl alcohol into polyfurfuryl alcohol at stage 250 and increase the percentage coefficient of variation of the polyfurfuryl alcohol polymer distribution. For example, when the surfactant (e.g., alkylbenzene sulfonic acid) is added at stage 240 and the polycondensation reaction (e.g., polymerization) is initiated at stage 250, furfuryl alcohol monomers may react through poly condensation reactions to form polyfurfuryl alcohol, which may migrate from the aqueous phase into the pre-existing hydrophobic emulsion droplets, which then become larger. New hydrophobic emulsion droplets of smaller size comprising hydrophobic polyfurfuryl alcohol suspended in an aqueous phase may also continue to be formed throughout the polycondensation reaction (e.g., polymerization) process.

Referring to FIG. 2, at stage 260, the glass transition temperature of the polymer particles comprising polyfurfuryl alcohol may be defined or modified. In some designs, the polymer particles do not include any glass transition temperature prior to stage 260, and then obtain a glass transition temperature during stage 260. In other designs, the polymer particles have a glass transition temperature prior to stage 260, and then the glass transition temperature is eliminated during stage 260. In yet other designs, the polymer particles have a glass transition temperature prior to stage 260, and this glass transition temperature is modified (e.g., increased or decreased) during stage 260. For example, the polymer particles produced at stage 250 may initially be in the form of polyfurfuryl alcohol polymer droplets, which may then at least partially solidify into a desired shape, such as a spherical shape, a near-spherical shape, a spheroidal shape, or a combination thereof (e.g., some of the particles are spherical while others are spheroidal or near-spherical, etc.). The degree of which the polyfurfuryl alcohol polymer phase is solidified is referred to herein as the "state of cure" of the polyfurfuryl alcohol polymer particle. The state of cure can be observed through modifications of the glass transition of the final polyfurfuryl alcohol powder. Hence, in some designs, the glass transition temperature modification at stage 260 may correspond to a curing stage of the polymer particle droplets. In some examples, the temperature in the reaction vessel can be increased to a temperature between about 31° C. and about 100° C. during some or all of the glass transition temperature modification of stage 260 to increase the glass transition temperature of the final polyfurfuryl alcohol polymer powder from about 20° C. to about 90° C. to above about 91° C. In some examples, the temperature in the reaction vessel may be increased stepwise in increments between about 0° C. and about 69° C. In some examples, additional Lewis or Bronsted acids, for example hydrochloric acid, sulfuric acid, hydrobromic acid, phosphoric acid, or nitric acid, may be added during some or all of the glass transition temperature modification of stage 260 to increase the glass transition temperature of the final polyfurfuryl alcohol polymer powder from about 20° C. to about 90° C. to above about 100° C. In some examples, the temperature in the reaction vessel may be increased to a temperature between 31° C. and 250° C. during some or all of the glass transition temperature modification of stage 260, and the pressure may be increased to between about 0.004 MPa and about 4 MPa to increase the glass transition temperature of the final polyfurfuryl alcohol polymer powder from 40° C. to 90° C. to above 100° C. In some examples, multiple processes may be combined to increase the glass transition temperature of the final polyfurfuryl alcohol polymer powder from 40° C. to 90° C. to above 100° C. Furthermore, in some designs, these processes may be used to modify a material that has a glass transition temperature from about 40° C. to about 200° C. to a material that no longer has a glass transition temperature, which is consistent with a fully cross-linked polyfurfuryl alcohol polymer state (e.g., the modifying at stage 260 eliminates the glass transition temperature of the polymer particles comprising polyfurfuryl alcohol such that a glass transition of the polymer particles comprising polyfurfuryl alcohol does not occur).

Referring to FIG. 2, in some designs, temperature may be an important variable in the polymerization of furfuryl alcohol into polyfurfuryl alcohol and can impact the final particle size distributions of a given polymerization. For example, for reactions that are initiated (at stage 250) at temperatures between about 60° C. and about 100° C., the inventors have discovered that temperature data shows a strong trend of warmer reaction temperatures being correlated with production of smaller particle sizes (e.g., a smaller particle sizes distribution, e.g., smaller droplet sizes). For example, an increase in temperature increases the reaction rate of the polymerization and cross-linking reactions, resulting in insufficient time for emulsion droplet growth, which may result in smaller or incomplete droplets. In a further example, an increase in temperature causes a decrease in interfacial tension between the hydrophobic phase which may consist of polyfurfuryl alcohol and the aqueous phase, which results in smaller particles being formed. Hence, control of temperature at stage 250 can be a useful tuning parameter for controlling the resultant droplet particle size distribution.

Referring to FIG. 2, in some designs, furfuryl alcohol concentration may be another important aspect of the polymerization of furfuryl alcohol, the derivative of furfuryl alcohol, or the mixture thereof, into polyfurfuryl alcohol and can impact the final particle size distributions of a given polymerization. For example, when changing the [Furfuryl Alcohol]:[Water] ratio between 0.18 and 0.25 in increments of ~0.02 in both, the inventors discovered a median particle size distribution values from 1.52 to 5.11 micron. Hence, in some designs, as the concentration of furfuryl alcohol the derivative of furfuryl alcohol, or the mixture thereof, increases, there is more furfuryl alcohol the derivative of furfuryl alcohol, or the mixture thereof, that may be utilized during the polymerization phase (e.g. after the reaction is initiated with an alkylbenzene sulfonic acid as in stage 240 of FIG. 2), which may allow for a greater concentration of polyfurfuryl alcohol available to migrate into the hydrophobic droplet phase at stage 250 of FIG. 2.

Referring to FIG. 2, in some designs, the chemical properties of the stabilizing compound(s) may be an important aspect of the polymerization of furfuryl alcohol the derivative of furfuryl alcohol, or the mixture thereof, into polyfurfuryl alcohol and may impact the final particle size distributions of a given polymerization. For example, in some designs when gum acacia is used as a stabilizing compound in the polymerization process at stage 210, a median particle size of 220 µm was produced when the third solution at stage 240 comprised a furfuryl alcohol concentration is at 19.6 wt. %, a gum acacia concentration of 0.17 wt. %, an alkylbenzene sulfonic acid with an average tail length of 11.3 at 0.95 wt. %, and when a reaction temperature of 70° C. was used. In some designs, when an 88% hydrolysis polyvinyl alcohol compound (e.g., percent of hydrolysis equals percent of acetate groups converted to alcohol groups) with a solution viscosity of about 47 to 52 mPa·s at 4 wt. % in water at 20° C. was used as a stabilizing compound in the polymerization process at stage 210, a median particle size of 3.2 µm was produced when the third solution at stage 240 comprised a furfuryl alcohol concentration is at 19.6 wt. %, an 88% hydrolysis polyvinyl alcohol compound (e.g., percent of hydrolysis equals percent of acetate groups converted to alcohol groups) with a solution viscosity of about 47 to 52 mPa·s at 4 wt. % in water at 20° C. at a concentration of 0.17 wt. %, an alkylbenzene sulfonic acid with an average tail length of 11.3 at 0.95 wt. %, and a reaction temperature of 70° C. was used.

Referring to FIG. 2, in some designs, if polyvinyl alcohol is used as a stabilizing compound, the percent hydrolysis of the polyvinyl alcohol may be an important property of polyvinyl alcohol that may impact the final particle size distributions of a given polymerization. For example, when an 88% hydrolysis polyvinyl alcohol compound (e.g., percent of hydrolysis equals percent of acetate groups converted to alcohol groups) with a solution viscosity of about 38 to 42 mPa·s at 4 wt. % in water at 20° C. was used, a median particle size distribution of 3.2 μm was produced. For example, when a 80% hydrolysis polyvinyl alcohol compound with a solution viscosity of about 38 to 42 mPa·s at 4 wt. % in water at 20° C. was used, a median particle size distribution of 2.1 μm was produced. In some designs, wherein a percent hydrolysis of the polyvinyl alcohol may be in the range between about 40% to about 99%. In some designs, a viscosity of a 4 wt. % solution of the polyvinyl alcohol at 20° C. is in the range between about 3 mPa·s to about 200 mPa·s.

Referring to FIG. 2, in some designs, if polyvinyl alcohol is used as a stabilizing compound, the viscosity of a 4 wt. % solution of polyvinyl alcohol at 20° C. may be an important property of polyvinyl alcohol that may impact the particle size distributions of a given polymerization. For example, when an 88% hydrolysis polyvinyl alcohol compound (e.g., percent of hydrolysis equals percent of acetate groups converted to alcohol groups) with a solution viscosity of about 38 to 42 mPa·s at 4 wt. % in water at 20° C. was used, a final polyfurfuryl alcohol polymer size distribution with a percent coefficient of variation of 31.67 was produced. For example, when an 88% hydrolysis polyvinyl alcohol compound (e.g., percent of hydrolysis equals percent of acetate groups converted to alcohol groups) with a solution viscosity of about 47 to 52 mPa·s at 4 wt. % in water at 20° C. was used, a polymer size distribution with a percent coefficient of variation of 5.86% was produced.

Referring to FIG. 2, in some designs, if an alkylbenzene sulfonic acid is used as the surfactant (e.g., acid initiator), the aliphatic carbon chain attached to carbon number 4 (e.g., the para-carbon position relative to the sulfonic acid group on the benzene ring) may be an important property of the alkylbenzene sulfonic acid that impacts final particle size distributions. In one example, an alkylbenzene sulfonic acid with an average chain length of 12.6 carbons attached to carbon number 4 (e.g., the para-carbon position relative to the sulfonic acid group on the benzene ring) produced a final polymer with a median particle size distribution of 4.46 μm. In another example, an alkylbenzene sulfonic acid with an average chain length of around 12.0 carbons attached to carbon number 4 (e.g., the para-carbon position relative to the sulfonic acid group on the benzene ring) produced a final polymer with a median particle size distribution of 4.2 μm. In another example, an alkylbenzene sulfonic acid with an average chain length of around 11.3 carbons attached to carbon number 4 (e.g., the para-carbon position relative to the sulfonic acid group on the benzene ring) produced a final polymer with a median particle size distribution of 3.50 μm.

Referring to FIG. 2, in some designs, municipal water (e.g., tap water) may be used in the process (e.g., in the aqueous solution at stage 210) to make polyfurfuryl alcohol polymer particles. In other designs, Type I deionized water may be used in the process (e.g., in the aqueous solution at stage 210) to make polyfurfuryl alcohol polymer particles. In other designs, Type II deionized water may be used in the process (e.g., in the aqueous solution at stage 210) to make polyfurfuryl alcohol polymer particles. In other designs, Type III deionized water may be used in the process (e.g., in the aqueous solution at stage 210) to make polyfurfuryl alcohol polymer particles. In other designs, Type IV deionized water may be used in the process (e.g., in the aqueous solution at stage 210) to make polyfurfuryl alcohol polymer particles. In other designs, any combination of municipal water, Type IV deionized water, Type II deionized water, Type I deionized water and/or Type III deionized water may be used in the process (e.g., in the aqueous solution at stage 210) to make polyfurfuryl alcohol polymer particles.

Referring to FIG. 2, in some designs, the purity of the furfuryl alcohol, the derivative of furfuryl alcohol, or the mixture thereof, used in reactions to make polymer (or polymer-derived) particles comprising polyfurfuryl alcohol in stage 250 may be an important aspect of the polymerization of furfuryl alcohol into polyfurfuryl alcohol and may impact the final particle size distributions of a given polymerization. For example, the cloudpoint temperature of the furfuryl alcohol, the derivative of furfuryl alcohol, or the mixture thereof, used in reactions to make polymer particles comprising polyfurfuryl alcohol in stage 250 may be used to modify the median particle size distribution and/or modify the percent coefficient of variation of the final polymer particles. In some designs, a furfuryl alcohol with a cloudpoint temperature of 17.3° C. produced a final polymer with a median particle size distribution of 2.64 μm and a percent coefficient of variation of 23.7%. In some designs, a furfuryl alcohol with a cloudpoint temperature of 7.3° C. produced a final polymer with a median particle size distribution of 2.48 μm and a percent coefficient of variation of 11.36%.

Referring to FIG. 2, in some designs, stabilizing compound concentration may be another important aspect of the polymerization of furfuryl alcohol, the derivative of furfuryl alcohol, or the mixture thereof, into polyfurfuryl alcohol and may impact the final particle size distributions of a given polymerization. For example, when increasing the concentration of an 88% hydrolysis polyvinyl alcohol compound (e.g., percent of hydrolysis equals percent of acetate groups converted to alcohol groups) with a solution viscosity of about 47 to 52 mPa·s at 4 wt. % in water at 20° C. from a concentration of 0.17 wt. % to 0.51 wt. %, the inventors discovered a decrease in median particle size distribution values from 2.25 μm to 1.9 μm, and a decrease in percent coefficient of variation from ~28% to 21%. Hence, in some designs, as the concentration of stabilizing compound increases, there may be more stabilizing compound available to prevent aggregation and coalescence of emulsion droplets during the polymerization phase at stage 250 of FIG. 2. (e.g. after the reaction is initiated with an alkylbenzene sulfonic acid as in stage 240 of FIG. 2), which may allow for smaller and more uniform droplets to form which leads to smaller median particle size distributions and lower % coefficient of variations of final polymer (or polymer-derived) particles comprising polyfurfuryl alcohol.

In some designs, the process of FIG. 2 may be carried out in a glass reaction vessel. In other designs, the process of FIG. 2 may be carried out in a glass-lined reaction vessel. In other designs, the process of FIG. 2 may be carried out in a stainless-steel reaction vessel.

In some designs, a tubular flow reactor assembly with stainless steel static mixing elements may be used to mix, initiate, and react the surfactant (e.g., alkylbenzene sulfonic acid) with the furfuryl alcohol, the derivative of furfuryl alcohol, or the mixture thereof, solution at stage 240 of FIG. 2. In some designs, a tubular flow reaction vessel with stainless steel helical static mixing elements may be used to mix the alkylbenzene sulfonic acid with the second mixture at stage 240 of FIG. 2 and initiate the polycondensation (e.g., polymerization) reaction at stage 250 of FIG. 2. In some designs, a tubular flow reaction vessel with helical type static mixing elements may be used to mix the surfactant (e.g., alkylbenzene sulfonic acid) with the second mixture at stage 240 of FIG. 2 and initiate the polycondensation (e.g., polymerization reaction) at stage 250 of FIG. 2. In some designs, a tubular flow reaction vessel with box-type static mixing elements may be used to mix the surfactant (e.g., alkylbenzene sulfonic acid) with the second mixture at stage 240 of FIG. 2 and initiate the polycondensation (e.g., polymerization) reaction at stage 250 of FIG. 2. In some designs, a tubular flow reaction vessel with helical type static mixing elements may be used to mix the surfactant (e.g., alkylbenzene sulfonic acid) with the second mixture at stage 240 of FIG. 2 and initiate the polycondensation (e.g., polymerization) reaction at stage 250 of FIG. 2. In some designs, metal tubular flow reaction vessels and static mixing elements, for example 304 or 316 grade stainless steel, may be used in the process to mix the surfactant (e.g., alkylbenzene sulfonic acid) with the second mixture at stage 240 of FIG. 2 and initiate the polycondensation (e.g., polymerization reaction) at stage 250 of FIG. 2. In some designs, plastic static mixing elements and tubular flow reaction vessels, for example fluoroplastics or polyethylene, may be used in the process to mix the surfactant (e.g., alkylbenzene sulfonic acid) with the second mixture at stage 240 of FIG. 2 and initiate the polycondensation (e.g., polymerization) reaction at stage 250 of FIG. 2. In some designs, plastic static mixing elements, for example fluoroplastics or polyethylene, and metal tubular flow reaction vessels, for example 304 or 316 grade stainless steel, may be used in the process to mix the surfactant (e.g., alkylbenzene sulfonic acid) with the second mixture at stage 240 of FIG. 2 and initiate the polycondensation (e.g., polymerization) reaction at stage 250 of FIG. 2.

In some designs, the process of FIG. 2 may be carried out in a low-pressure reactor.

In some designs, the process of FIG. 2 may be carried out in a high-pressure reactor.

In some designs, the polymer (or polymer-derived) particles produced at stage 250 of FIG. 2 may comprise an average particle size between about 100 nanometers to about 100 microns.

In some designs, the polymer (or polymer-derived) particles produced at stage 250 of FIG. 2 may be substantially uniform in terms of size, shape and composition.

Below, a number of Working Examples are described in detail. Working Examples #1 through #10 each corresponds to a non-limiting example implementation of the process of FIG. 2. Working Examples #11-12 each correspond to one or more post-processing stages that can be performed with respect to polymer (or polymer-derived) particles produced in accordance with the process of FIG. 2.

Working Example #1

2.22 parts by mass of a polyvinyl alcohol compound with a hydrolysis percent of around 80% (percent of hydrolysis equals percent of acetate groups converted to alcohol groups) and a viscosity of around 38 to 42 mPa·s when measured as a 4 wt. % aqueous solution at 20° C., was added to a reaction vessel containing 910 parts by mass of water while stirring. Next, the water solution containing the polyvinyl alcohol stabilizing compound was heated to an internal temperature of 80° C. for four hours to form a heterogeneous solution or polyvinyl alcohol dispersed in water. After four hours, the polyvinyl alcohol in water solution cooled 25° C. to form a transparent homogeneous solution of dissolved polyvinyl alcohol in water. Next, 252 parts by mass Furfuryl Alcohol was added to the reaction vessel while mixing at 500 RPM. The water solution containing polyvinyl alcohol, furfuryl alcohol, and water was heated to 70° C. Separately, in a second reaction vessel, a 10 wt. % aqueous solution of an alkylbenzene sulfonic acid with an average chain length distribution of 10.3 carbons in water was prepared. When the homogenous solution containing furfuryl alcohol, polyvinyl alcohol, and water was around 70° C. and while stirring at 500 RPM, around 116 parts by mass of the 10 wt. % alkylbenzene sulfonic acid solution at 25° C. was added to the reaction vessel containing furfuryl alcohol, polyvinyl alcohol, water, to form a new solution of furfuryl alcohol, polyvinyl alcohol, water, and alkylbenzene sulfonic acid. The addition of the 10 wt. % alkylbenzene sulfonic acid aqueous solution initiated the polymerization, which was allowed to continue for 1 hour during the exothermic polycondensation reaction. After 1 hour, the solution was then heated to 80° C. and held at that temperature for 48 hours while stirring. Afterward, the solution was allowed to cool to room temperature and the solid polymer product was separated from the liquid phase and analyzed. In this example, the final median particle size was found to be 2.82 µm, the final mode particle size was found to be 3.06 µm, and the final percent coefficient of variation was found to be 3.93%.

Figure 3:
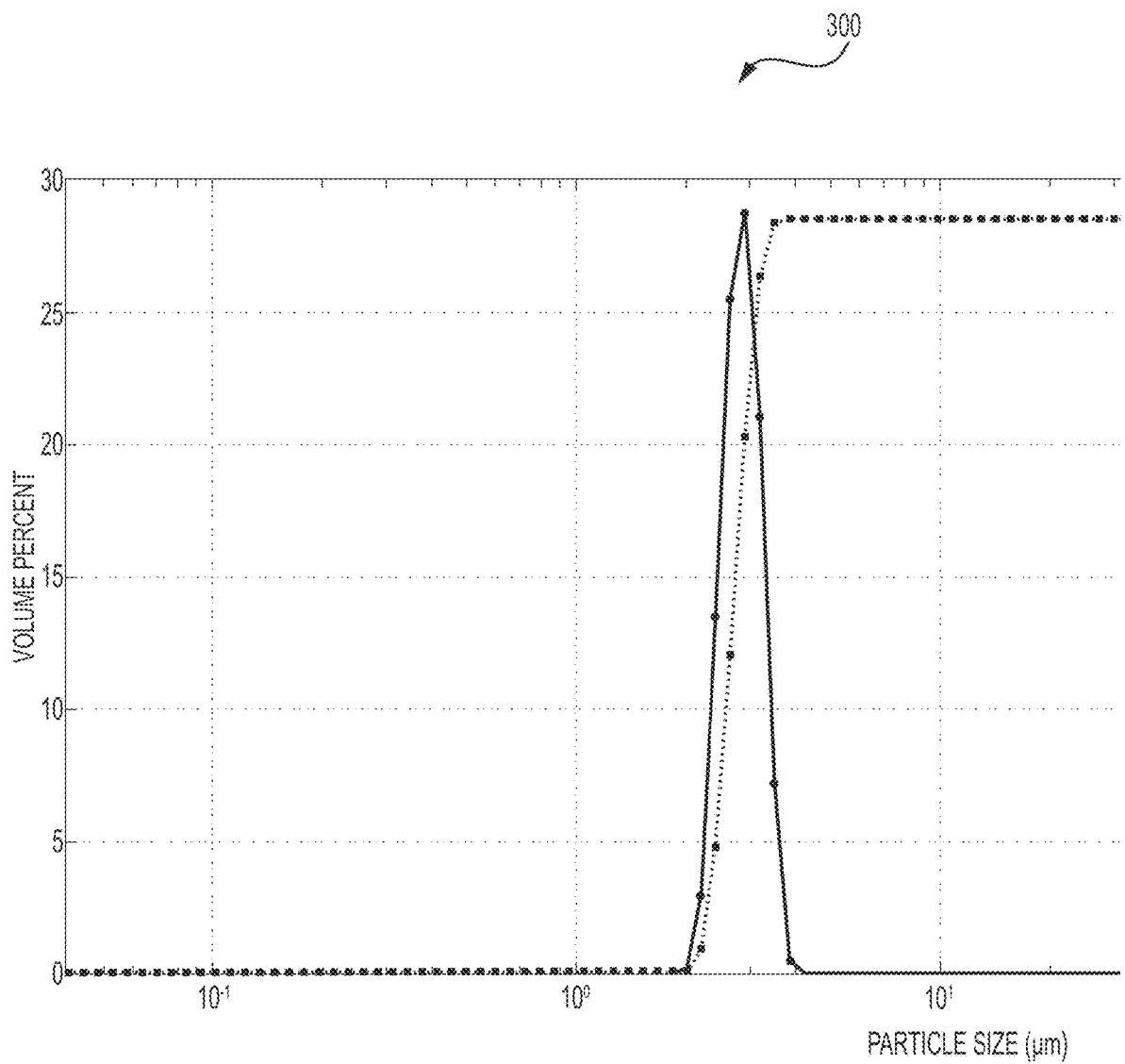
FIG. 3 illustrates a particle size distribution of polymer particles produced in accordance with Working Example #1 in accordance with an aspect of the disclosure.
Figure 4:
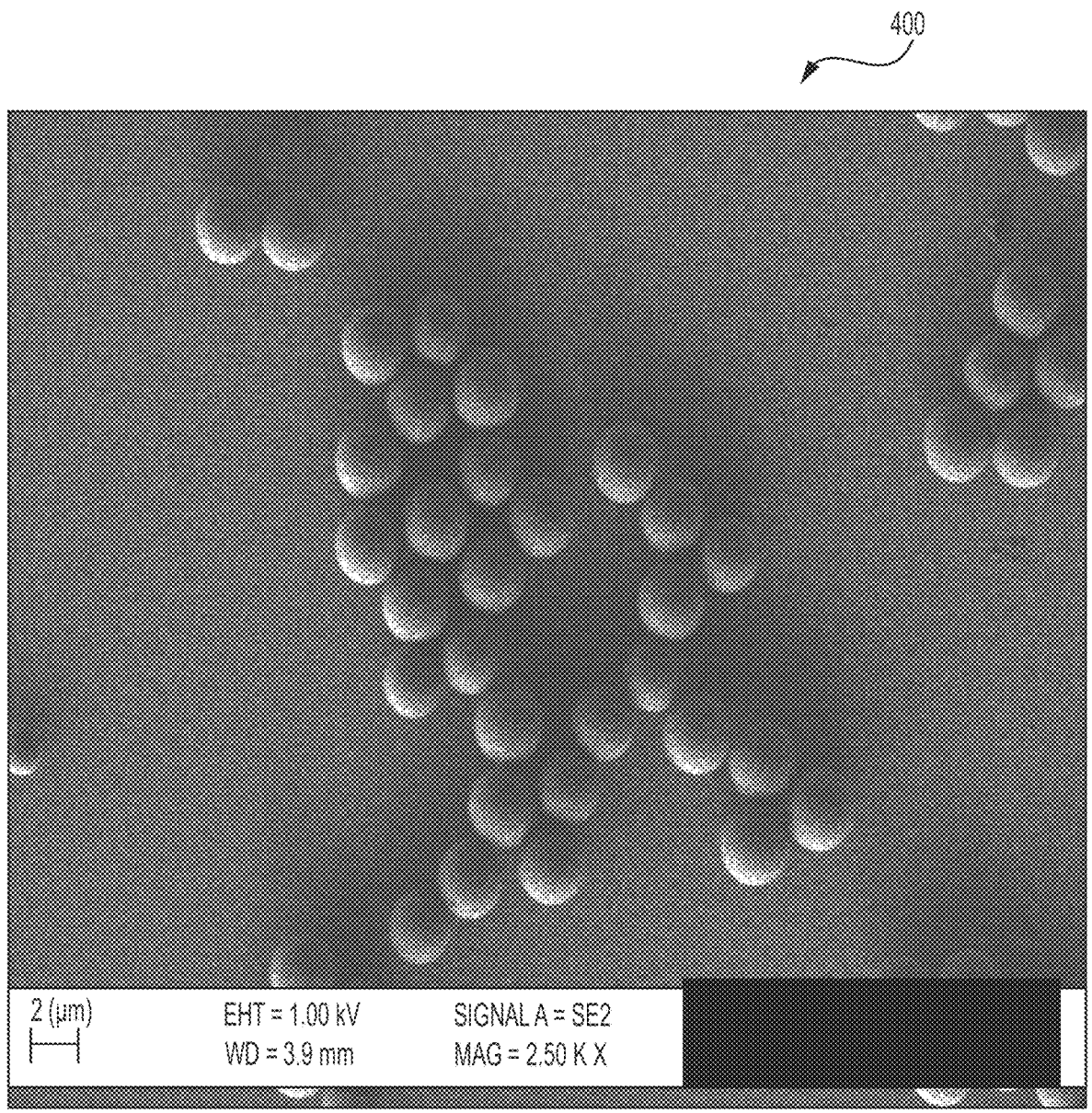
FIG. 4 illustrates polymer particles produced in accordance with Working Example #1 as captured by via scanning electron microscope (SEM) in accordance with an aspect of the disclosure.

FIG. 3 illustrates a particle size distribution 300 of polymer particles produced in accordance with Working Example #1 in accordance with an aspect of the disclosure. In FIG. 3, the x-axis depicts a logarithmic scale of particle size in microns while the y-axis depicts the percent volume weighted distribution of the sample. The blue plotline represents the percent volume weighted distribution at a given particle size; the red plotline represents the running total percent volume weighted distribution of the sample up to a given particle size. FIG. 4 illustrates polymer particles 400 produced in accordance with Working Example #1 as captured by via scanning electron microscope (SEM) in accordance with an aspect of the disclosure.

Working Example #2

2.22 parts by mass of a polyvinyl alcohol compound with a hydrolysis percent of around 80% (percent of hydrolysis equals percent of acetate groups converted to alcohol groups) and a viscosity of around 38 to 42 mPa·s when measured as a 4 wt. % aqueous solution at 20° C., was added to a first reaction vessel containing 910 parts by mass of water while stirring. Next, the water solution containing the polyvinyl alcohol stabilizing compound was heated to a temperature of about 80° C. for four hours to form a heterogeneous solution or polyvinyl alcohol dispersed in water. After four hours, the polyvinyl alcohol in water solution was allowed to cool down to 25° C. to form a transparent homogeneous solution of dissolved polyvinyl alcohol in water. Next, 252 parts by mass of Furfuryl Alcohol was added to the reaction vessel while mixing. The water solution containing polyvinyl alcohol, furfuryl alcohol, and water was heated to 80° C. Separately, in a second reaction vessel, a 10 wt. % aqueous solution of an alkylbenzene sulfonic acid with an average chain length distribution of 10.3 carbons in water was prepared. When the homogenous solution containing furfuryl alcohol, polyvinyl alcohol, and water was around 80° C. and while stirring at 500 RPM, around 116 parts by mass of the 10 wt. % alkylbenzene sulfonic acid solution at 25° C. was added to the first reaction vessel containing furfuryl alcohol, polyvinyl alcohol, water, to form a new solution of furfuryl alcohol, polyvinyl alcohol, water, and alkylbenzene sulfonic acid. The addition of the 10 wt. % alkylbenzene sulfonic acid aqueous solution initiates the polymerization, which was allowed to continue for 1 hour during the exothermic polycondensation reaction. After 1 hour, the solution was held at around 80° C. for 47 hours while stirring at 500 RPM. Afterward, the solution was allowed to cool to room temperature and the solid polymer product was separated from the liquid phase and analyzed. In this example, the final median particle size was found to be 1.88 um, the final mode particle size was found to be 2.31 µm, and the final percent coefficient of variation was found to be 10.05%

Figure 5:
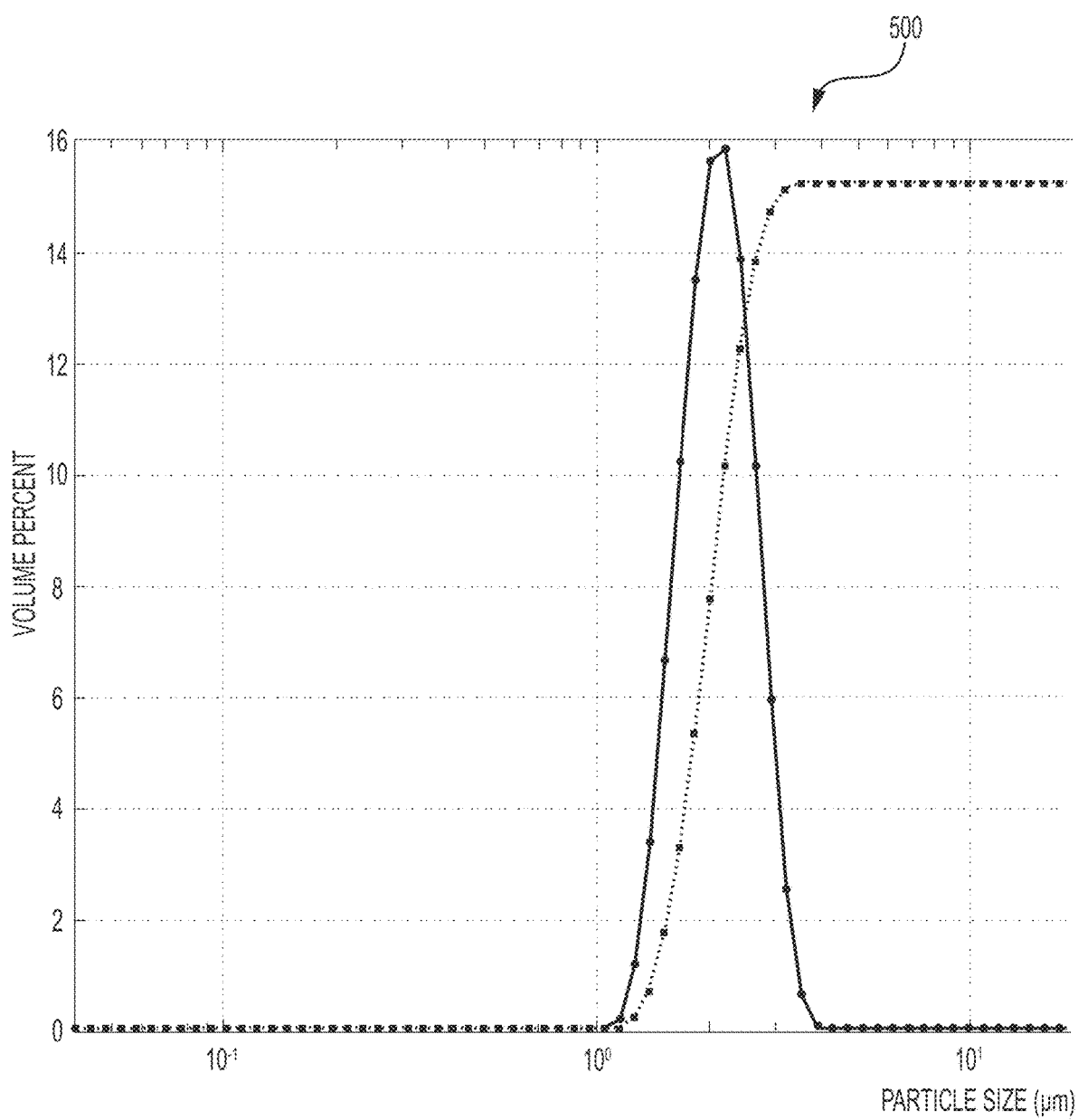
FIG. 5 illustrates a particle size distribution of polymer particles produced in accordance with Working Example #2 in accordance with an aspect of the disclosure.
Figure 6:
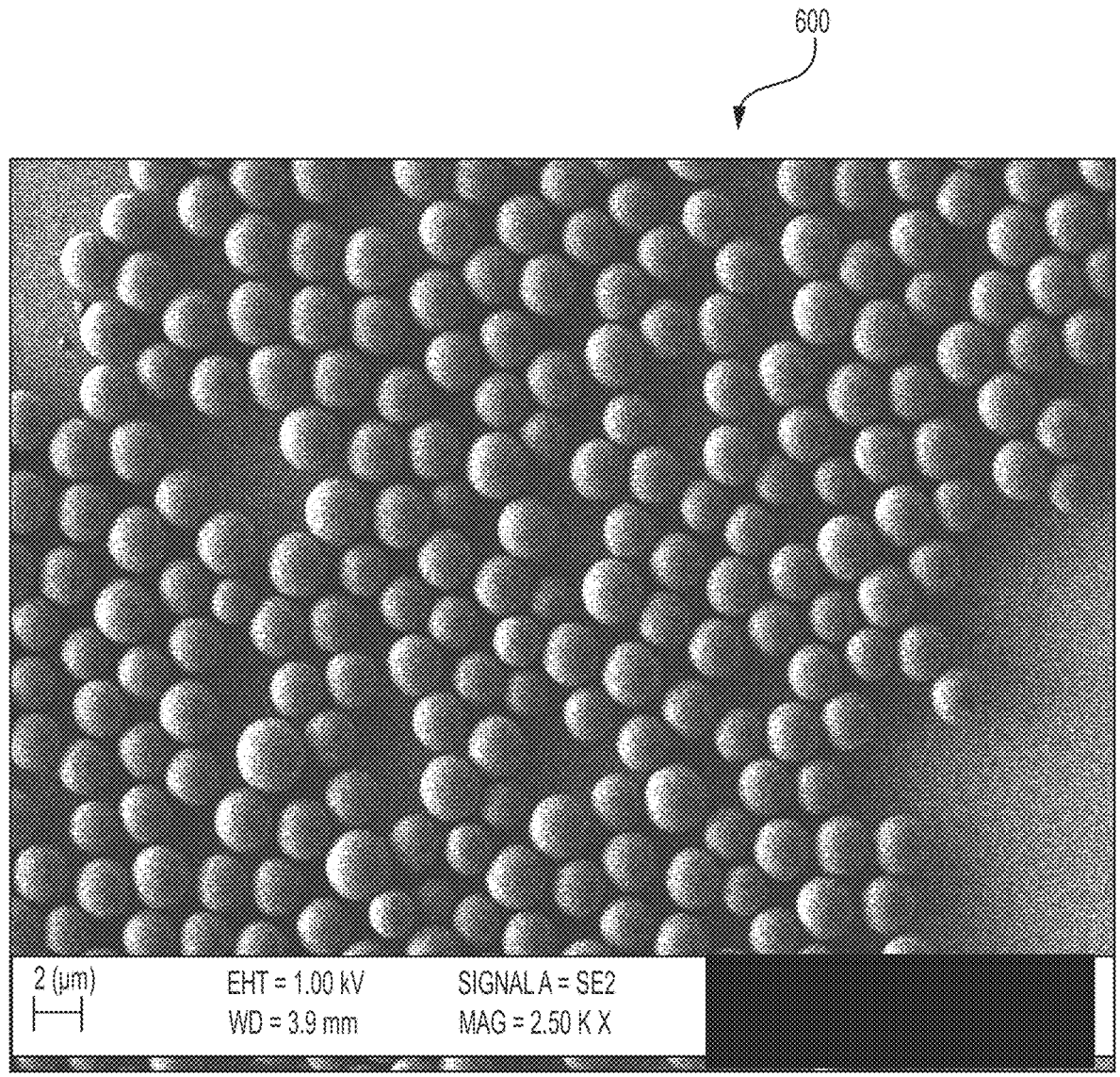
FIG. 6 illustrates polymer produced in accordance with Working Example #2 as captured by via SEM in accordance with an aspect of the disclosure.

FIG. 5 illustrates a particle size distribution 500 of polymer particles produced in accordance with Working Example #2 in accordance with an aspect of the disclosure. In FIG. 5, the x-axis depicts a logarithmic scale of particle size in microns while the y-axis depicts the percent volume weighted distribution of the sample. The blue plotline represents the percent volume weighted distribution at a given particle size; the red plotline represents the running total percent volume weighted distribution of the sample up to a given particle size. FIG. 6 illustrates polymer particles 600 produced in accordance with Working Example #2 as captured by via SEM in accordance with an aspect of the disclosure.

Working Example #3

2.22 parts by mass of a polyvinyl alcohol compound with a hydrolysis percent of around 88% (percent of hydrolysis equals percent of acetate groups converted to alcohol groups) and a viscosity of around 48 to 52 mPa·s when measured as a 4 wt. % aqueous solution at 20° C., was added to a first reaction vessel containing 910 parts by mass of water while stirring. Next, the water solution containing the polyvinyl alcohol stabilizing compound was heated to an internal temperature of 90° C. for about 12 hours to form a homogenous solution of polyvinyl alcohol dissolved in water. After 12 hours, the polyvinyl alcohol in water solution was allowed to cool down to 25° C. Next, 252 parts by mass of furfuryl alcohol (>98.5% pure by gas chromatograph (GC) analysis) was added to the reaction vessel while mixing. The first reaction vessel containing polyvinyl alcohol, furfuryl alcohol, and water was heated to 70° C. Separately, in a second reaction vessel, a 10 wt. % aqueous solution of an alkylbenzene sulfonic acid, with an average chain length distribution of 10.3 carbons, dissolved in water was prepared. When the homogenous solution containing furfuryl alcohol, polyvinyl alcohol, and water was around 70° C. and while stirring at 500 RPM, around 116 parts by mass of the 10 wt. % alkylbenzene sulfonic acid solution at 25° C. was added to the first reaction vessel containing furfuryl alcohol, polyvinyl alcohol, water, to form a new solution of furfuryl alcohol, polyvinyl alcohol, water, and alkylbenzene sulfonic acid. The addition of the 10 wt. % alkylbenzene sulfonic acid aqueous solution initiated the polymerization, which was allowed to continue for 1 hour during the exothermic polycondensation reaction. After 1 hour, the solution is then heated to 80° C. and held at that temperature for 48 hours while stirring at 500 RPM. Afterward, the solution was allowed to cool to room temperature and the solid polymer product was separated from the liquid phase and analyzed. In this example, the final median particle size was found to be 4.00 µm, the final mode particle size was found to be 4.24 µm, and the final percent coefficient of variation was found to be 5.14%.

Figure 7:
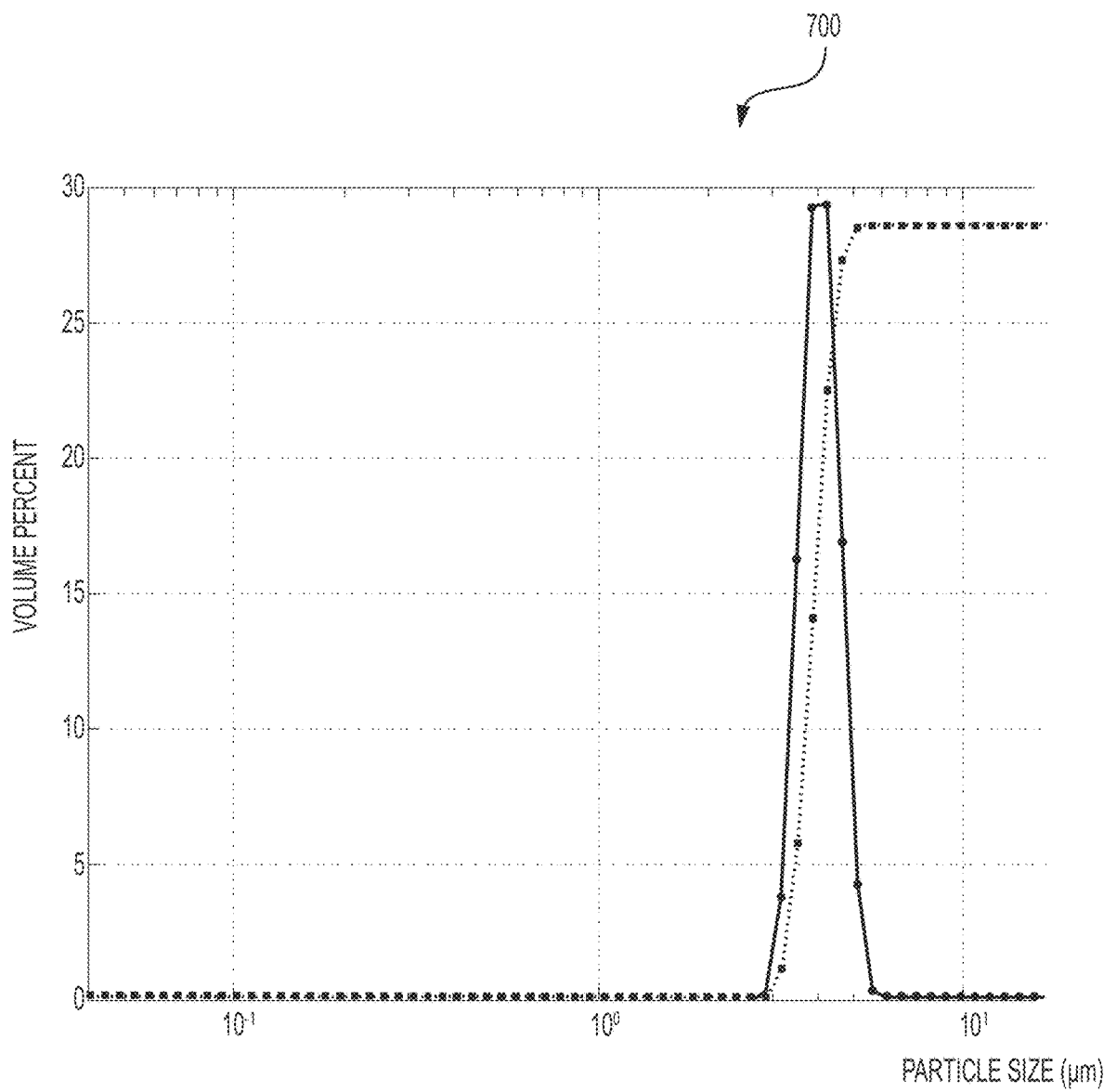
FIG. 7 illustrates a particle size distribution of polymer particles produced in accordance with Working Example #3 in accordance with an aspect of the disclosure.
Figure 8:
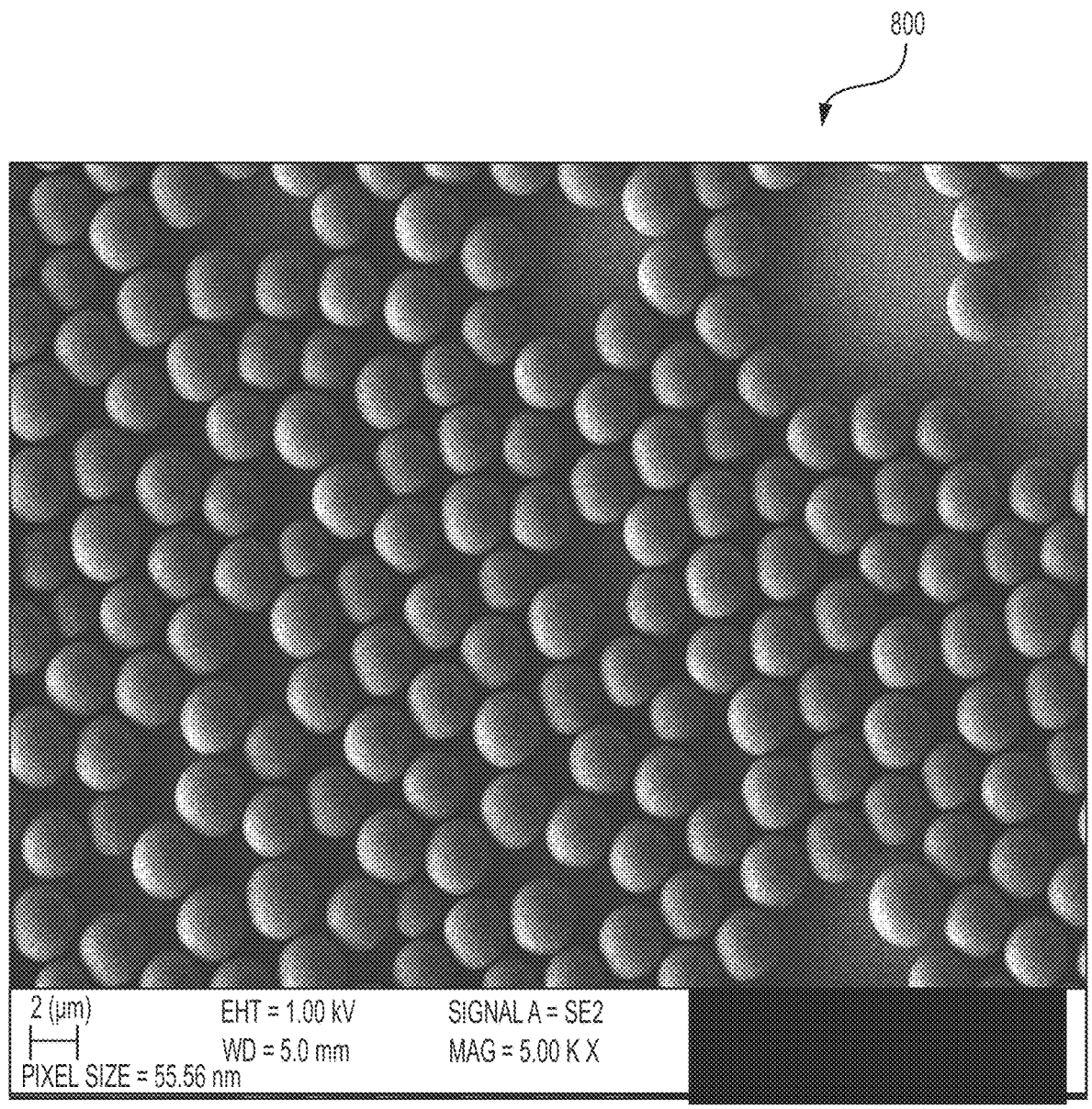
FIG. 8 illustrates polymer particles produced in accordance with Working Example #3 as captured by via SEM in accordance with an aspect of the disclosure.

FIG. 7 illustrates a particle size distribution 700 of polymer particles produced in accordance with Working Example #3 in accordance with an aspect of the disclosure. In FIG. 7, the x-axis depicts a logarithmic scale of particle size in microns while the y-axis depicts the percent volume weighted distribution of the sample. The blue plotline represents the percent volume weighted distribution at a given particle size; the red plotline represents the running total percent volume weighted distribution of the sample up to a given particle size. FIG. 8 illustrates polymer particles 800 produced in accordance with Working Example #3 as captured by via SEM in accordance with an aspect of the disclosure.

Working Example #4

2.22 parts by mass of a polyvinyl alcohol compound with a hydrolysis percent of around 88% (percent of hydrolysis equals percent of acetate groups converted to alcohol groups) and a viscosity of around 48 to 52 mPa·s when measured as a 4 wt. % aqueous solution at 20° C., was added to a reaction vessel containing 910 parts by mass of water while stirring. Next, the reaction vessel containing water and polyvinyl alcohol was heated to an internal temperature of 90° C. for 12 hours to form a homogenous solution or polyvinyl alcohol dissolved in water. After 12 hours, the polyvinyl alcohol in water solution was allowed to cool down to 25° C. Next, 252 parts by mass of Furfuryl Alcohol (>98.5% pure by GC analysis) was added to the first reaction vessel while mixing. The first reaction vessel containing polyvinyl alcohol, furfuryl alcohol, and water was heated to 70° C. Separately, in a second reaction vessel, a 10 wt. % aqueous solution of an alkylbenzene sulfonic acid, with an average chain length distribution of 12.6 carbons, dissolved in water was prepared. When the homogenous solution containing furfuryl alcohol, polyvinyl alcohol, and water was around 70° C. and while stirring, around 116 parts by mass of the 10 wt. % alkylbenzene sulfonic acid solution at 25° C. was added to the reaction vessel containing furfuryl alcohol, polyvinyl alcohol, water, to form a new solution of furfuryl alcohol, polyvinyl alcohol, water, and alkylbenzene sulfonic acid. The addition of the 10 wt. % alkylbenzene sulfonic acid aqueous solution initiated the polymerization, which was allowed to continue for 1 hour during the exothermic polycondensation reaction. After 1 hour, the solution was then heated to 80° C. and held at that temperature for 48 hours while stirring. Afterward, the solution was allowed to cool to room temperature and the solid polymer product was separated from the liquid phase and analyzed. In this example, the final median particle size was found to be 5.99 um, the final mode particle size was found to be 5.78 µm, and the final percent coefficient of variation was found to be 12.62%.

Figure 9:
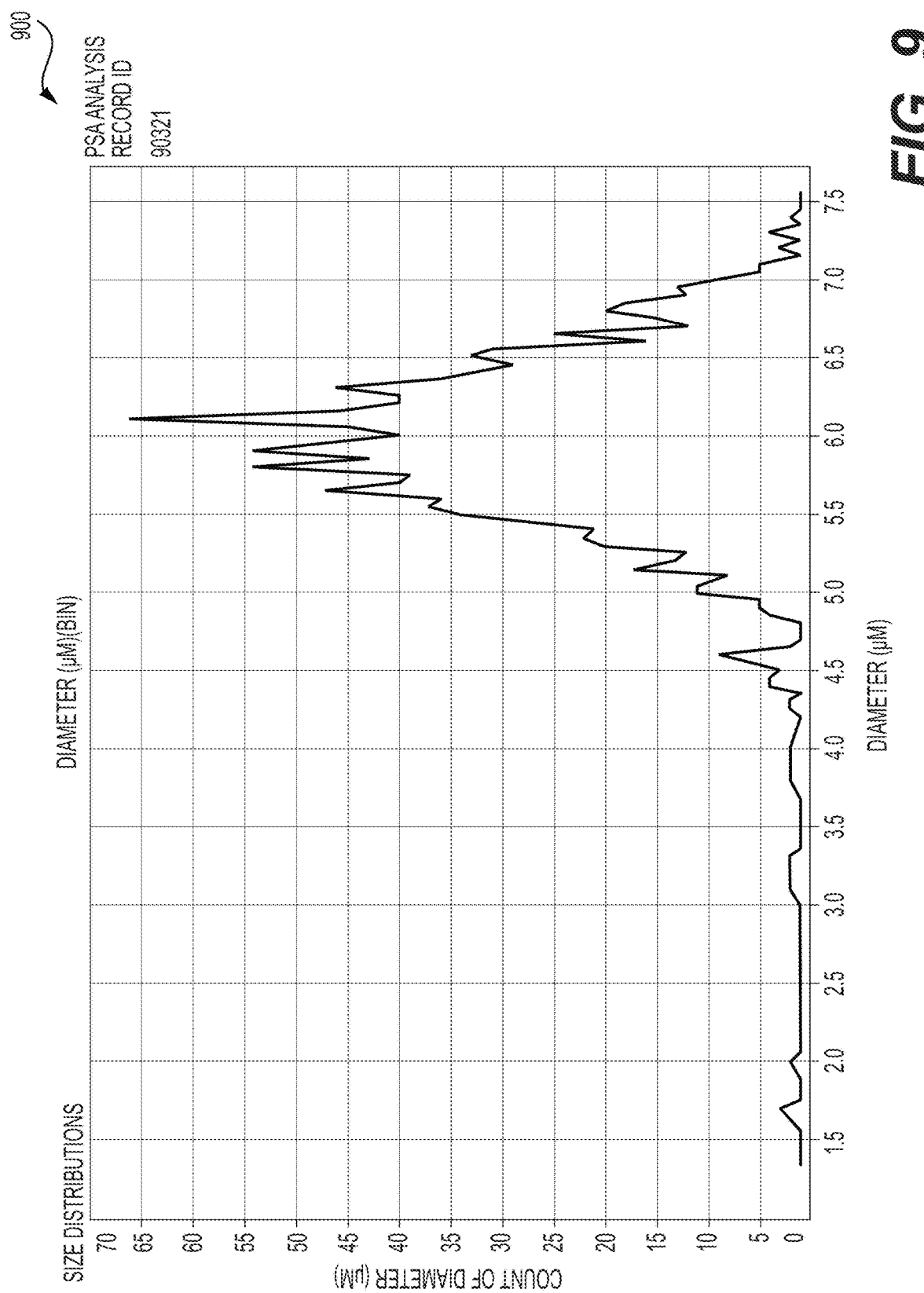
FIG. 9 illustrates a particle size distribution of polymer particles produced in accordance with Working Example #4 in accordance with an aspect of the disclosure.
Figure 10:
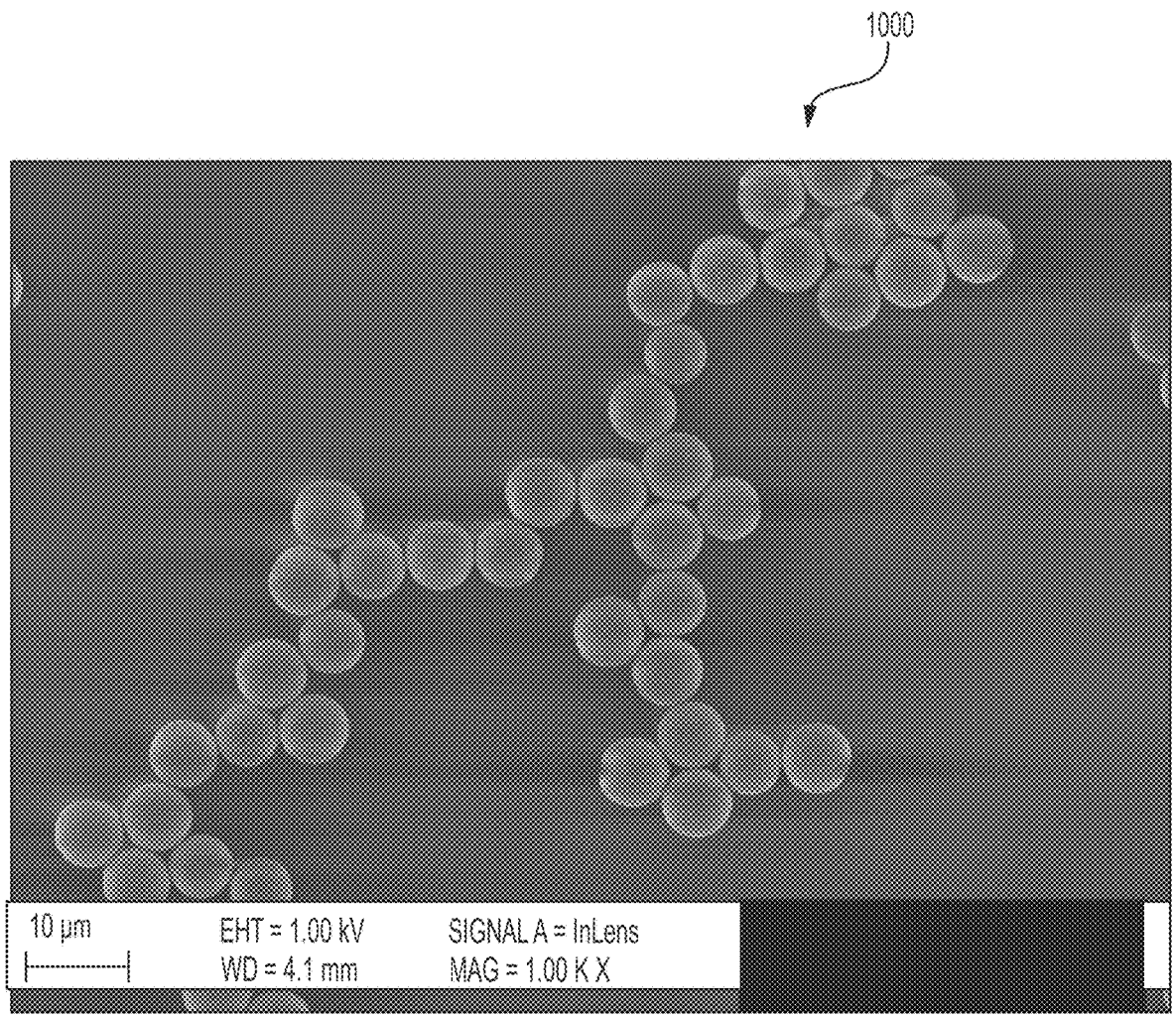
FIG. 10 illustrates polymer particles produced in accordance with Working Example #4 as captured by via SEM in accordance with an aspect of the disclosure.

FIG. 9 illustrates a particle size distribution 900 of polymer particles produced in accordance with Working Example #4 in accordance with an aspect of the disclosure. In FIG. 9, the x-axis depicts particle size in microns while the y-axis depicts the number of particles at a given particle size. FIG. 10 illustrates polymer particles 1000 produced in accordance with Working Example #4 as captured by via SEM in accordance with an aspect of the disclosure.

Working Example #5

2.22 parts by mass of a polyvinyl alcohol compound with a hydrolysis percent of around 80% (percent of hydrolysis equals percent of acetate groups converted to alcohol groups) and a viscosity of around 38 to 42 mPa·s when measured as a 4 wt. % aqueous solution at 20° C., was added to a first reaction vessel containing 910 parts by mass of water while stirring. Next, the first reaction vessel containing water and polyvinyl alcohol was heated to an internal temperature of 80° C. for 4 hours to form a heterogeneous solution or polyvinyl alcohol dispersed in water. After four hours, the polyvinyl alcohol in water solution was allowed to cool down to 25° C. to form a transparent homogeneous solution of dissolved polyvinyl alcohol in water. Next, 252 parts by mass of furfuryl alcohol (>98.5% by GC analysis) was added to the solution while mixing. The first reaction vessel containing polyvinyl alcohol, furfuryl alcohol, and water was heated to 40° C. Separately, in a second reaction vessel, a 10 wt. % aqueous solution of an alkylbenzene sulfonic acid, with an average chain length distribution of 11.3 carbons, dissolved in water was prepared. When the homogenous solution containing furfuryl alcohol, polyvinyl alcohol, and water was around 40° C. and stirring, around 116 parts by mass of the 10 wt. % alkylbenzene sulfonic acid solution at 25° C. was added to the first reaction vessel to form a new solution of furfuryl alcohol, polyvinyl alcohol, water, and alkylbenzene sulfonic acid. The addition of the 10 wt. % alkylbenzene sulfonic acid aqueous solution initiated the polymerization, which was allowed to continue for 1 hour at 40° C. while stirring. After 1 hour, the first reaction vessel was then heated to 50° C. and held at that temperature for 1 hour while stirring. After 1 hour, the first reaction vessel was then heated to 60° C. and held at that temperature for 1 hour while stirring. After 1 hour, the first reaction vessel was then heated to 70° C. and held at that temperature for 1 hour while stirring. After 1 hour, the first reaction vessel was then heated to 80° C. and held at that temperature for 45 hours while stirring. Afterward, the solution was allowed to cool to room temperature and the solid polymer product was separated from the liquid phase and analyzed. In this example, the final median particle size was found to be 1.96 μm, the final mode particle size was found to be 1.87 μm, and the final percent coefficient of variation was found to be 21.39%.

Figure 11:
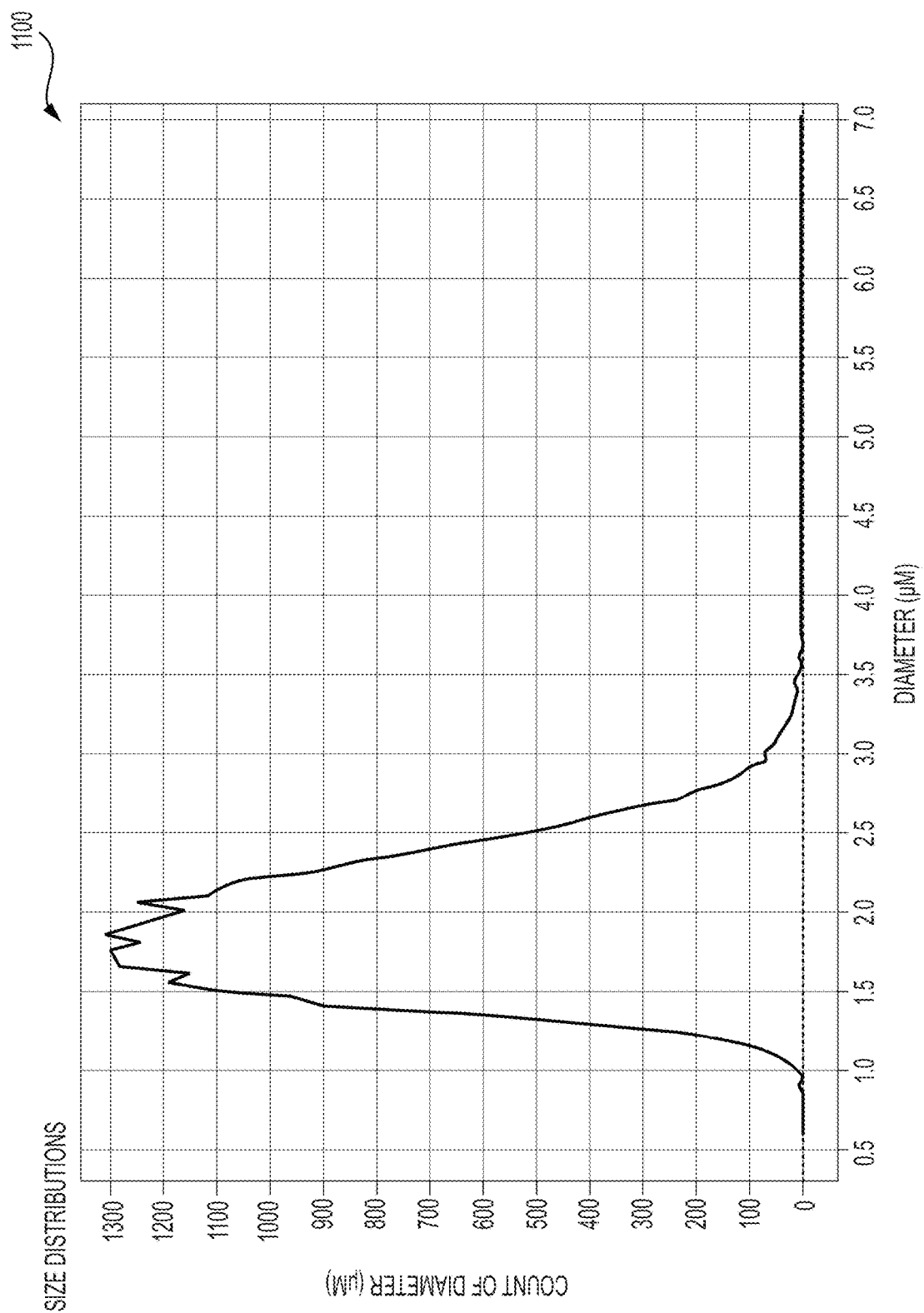
FIG. 11 illustrates a particle size distribution of polymer particles produced in accordance with Working Example #5 in accordance with an aspect of the disclosure.
Figure 12:
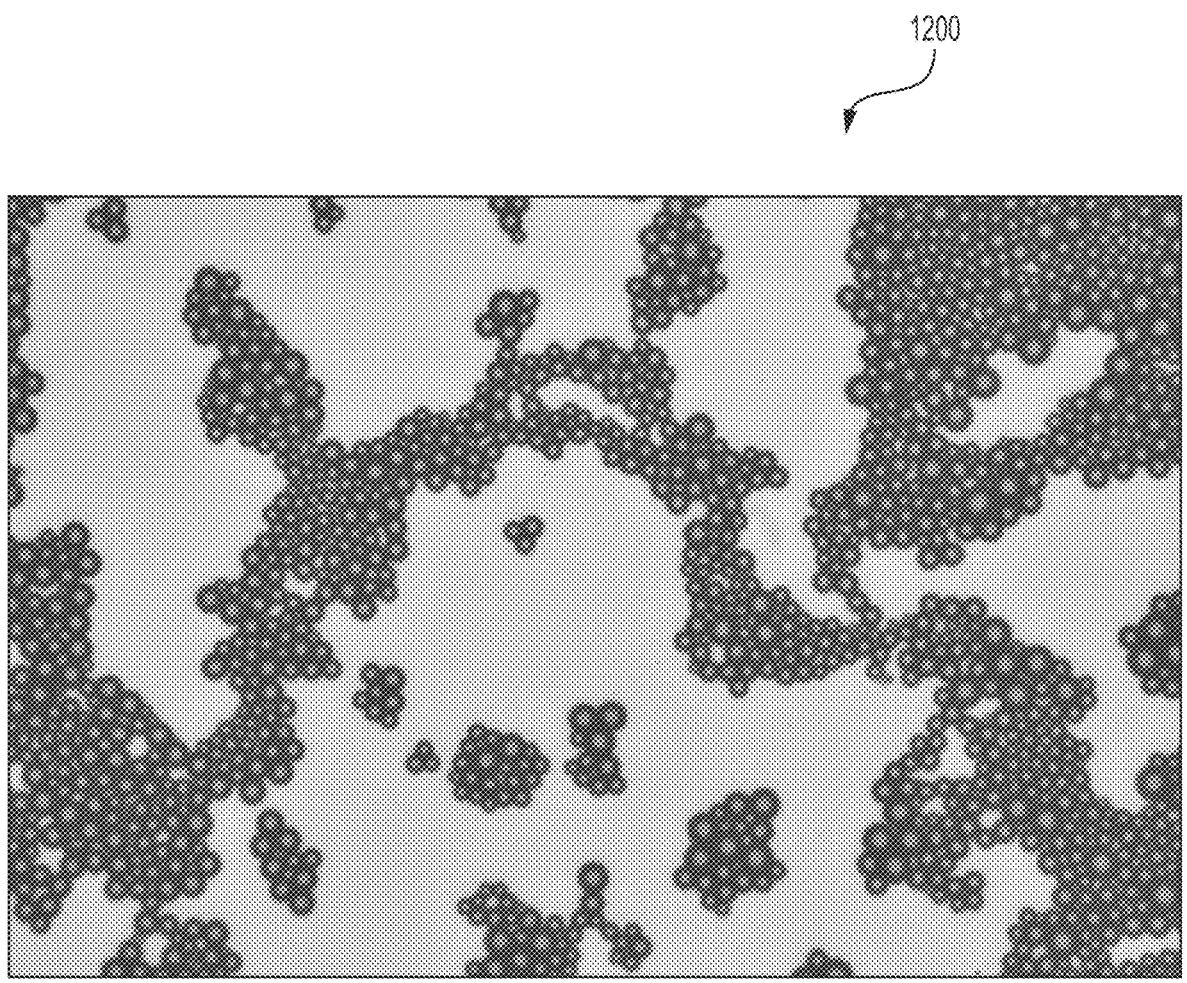
FIG. 12 illustrates polymer particles produced in accordance with Working Example #5 as captured by light optical microscopy in accordance with an aspect of the disclosure.

FIG. 11 illustrates a particle size distribution 1100 of polymer particles produced in accordance with Working Example #5 in accordance with an aspect of the disclosure. In FIG. 11, the x-axis depicts particle size in microns while the y-axis depicts the number of particles at a given particle size. FIG. 12 illustrates polymer particles 1200 produced in accordance with Working Example #5 as captured by light optical microscopy in accordance with an aspect of the disclosure.

Working Example #6

3.108 parts by mass of a polyvinyl alcohol compound with a hydrolysis percent of around 87-89% (percent of hydrolysis equals percent of acetate groups converted to alcohol groups) and a viscosity of around 38 to 42 mPa·s when measured as a 4 wt. % aqueous solution at 20° C., was added to a first reaction vessel containing 560.7 parts by mass of water while stirring. Next, the first reaction vessel containing water and polyvinyl alcohol was heated to an internal temperature of 80° C. for 12 hours to form a homogeneous solution of polyvinyl alcohol dissolved in water. After 12 hours, the polyvinyl alcohol in water solution is allowed to cool down to 70° C. Next, 252 parts by mass of Furfuryl Alcohol (>98.5% by GC analysis) was added to the first reaction vessel while mixing and held at 70° C. Separately, in a second reaction vessel, a 1.86 wt. % aqueous solution of an alkylbenzene sulfonic acid, with an average chain length distribution of 10.3 carbons, dissolved in water was prepared and heated to around 70° C. in the second reaction vessel. When the homogenous solution containing furfuryl alcohol, polyvinyl alcohol, and water was around 70° C. and while stirring, around 876 parts by mass of the 1.86 wt. % alkylbenzene sulfonic acid solution at 70° C. was added to the first reaction vessel containing furfuryl alcohol, polyvinyl alcohol, water, to form a new solution of furfuryl alcohol, polyvinyl alcohol, water, and alkylbenzene sulfonic acid. The addition of the alkylbenzene sulfonic acid initiated the polymerization, which was allowed to continue for 1 hour during the exothermic polycondensation reaction. After 1 hour, the solution was then heated to 80° C. and held at that temperature for 48 hours while stirring. Afterward, the solution was allowed to cool to room temperature and the solid polymer product was separated from the liquid phase and analyzed. In this example, the final median particle size was found to be 3.49 μm, the final mode particle size was found to be 3.69 μm, and the final percent coefficient of variation was found to be 2.07%.

Figure 13:
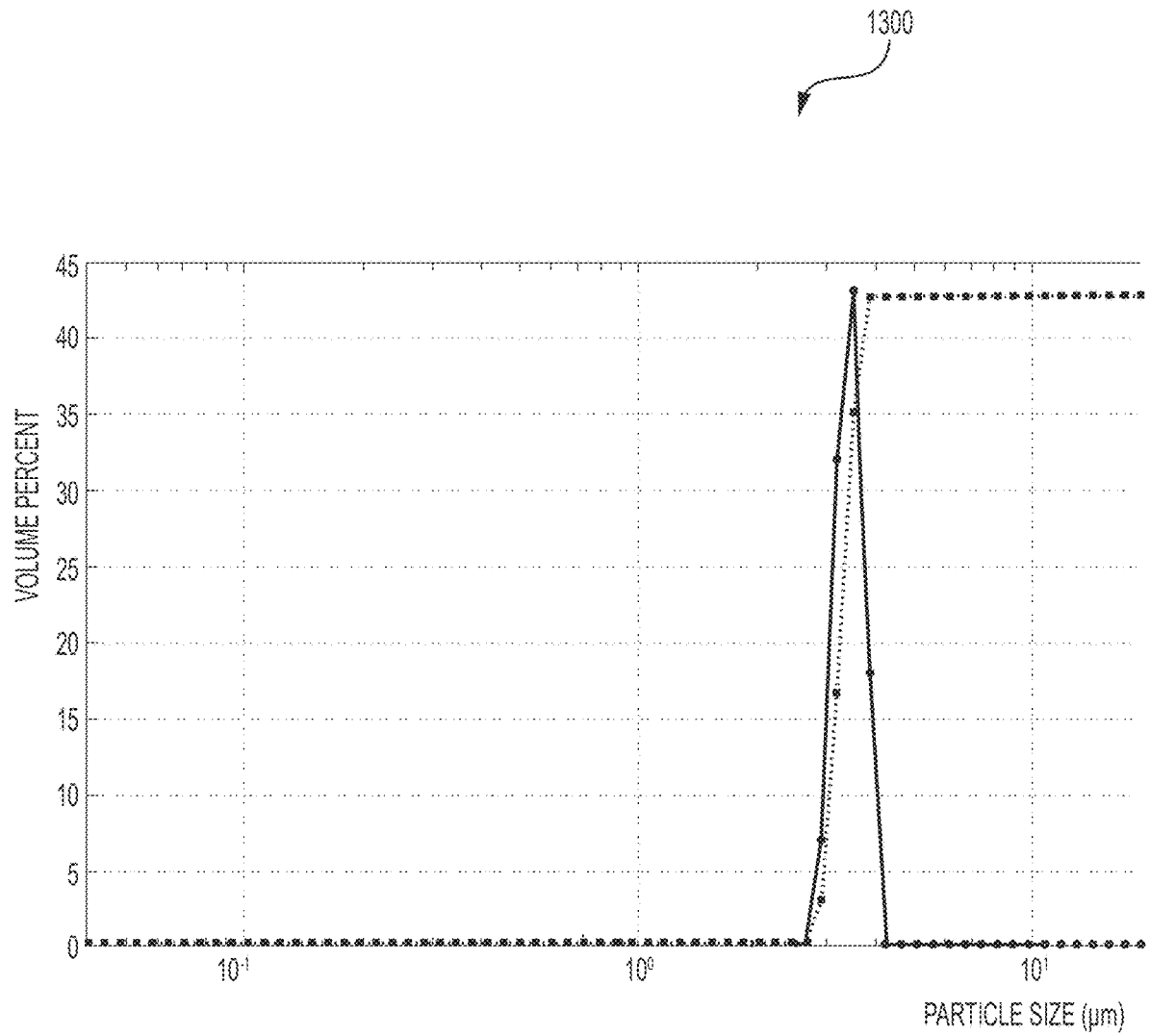
FIG. 13 illustrates a particle size distribution of polymer particles produced in accordance with Working Example #6 in accordance with an aspect of the disclosure.
Figure 14:
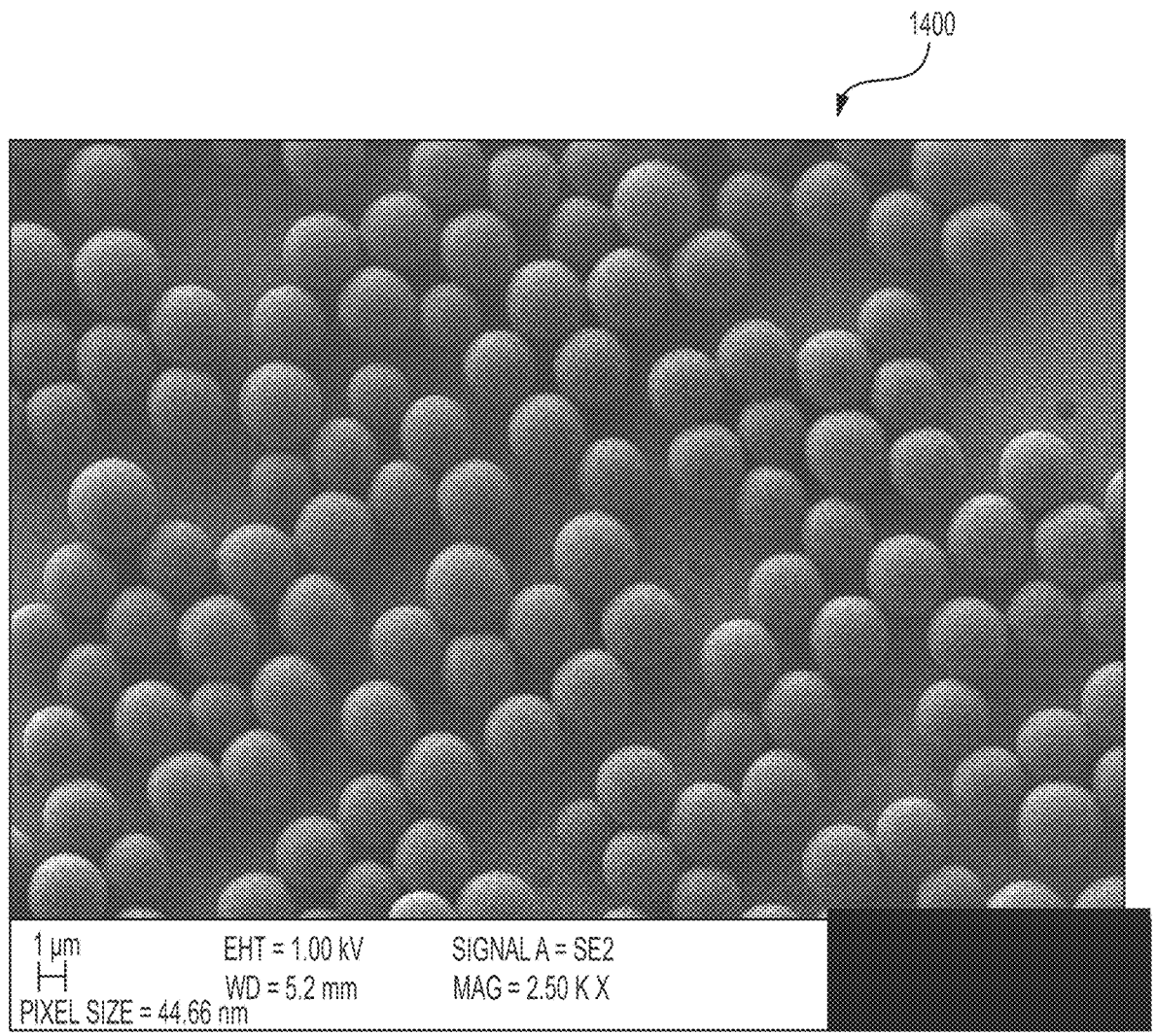
FIG. 14 illustrates polymer particles produced in accordance with Working Example #6 as captured by via SEM in accordance with an aspect of the disclosure.

FIG. 13 illustrates a particle size distribution 1300 of polymer particles produced in accordance with Working Example #6 in accordance with an aspect of the disclosure. In FIG. 13, the x-axis depicts a logarithmic scale of particle size in microns while the y-axis depicts the percent volume weighted distribution of the sample. The blue plotline represents the percent volume weighted distribution at a given particle size; the red plotline represents the running total percent volume weighted distribution of the sample up to a given particle size. FIG. 14 illustrates polymer particles 1400 produced in accordance with Working Example #6 as captured by via SEM in accordance with an aspect of the disclosure.

Working Example #7

6.66 parts by mass of a polyvinyl alcohol compound with a hydrolysis percent of around 80% (percent of hydrolysis equals percent of acetate groups converted to alcohol groups) and a viscosity of around 38 to 42 mPa·s when measured as a 4 wt. % aqueous solution at 20° C., was added to a first reaction vessel containing 910 parts by mass of water while stirring. Next, the first reaction vessel containing water and polyvinyl alcohol was heated to an internal temperature of 80° C. for 4 hours to form a heterogeneous solution or polyvinyl alcohol dispersed in water. After four hours, the polyvinyl alcohol in water solution was allowed to cool down to 25° C. to form a transparent homogeneous solution of dissolved polyvinyl alcohol in water. Next, 202 parts by mass of a Furfuryl Alcohol with a cloudpoint of 17.3° C. was added to the first reaction vessel while mixing. The first reaction vessel containing the heterogeneous solution of polyvinyl alcohol, furfuryl alcohol, and water was heated to 60° C. Separately, in a second reaction vessel, a 10 wt. % aqueous solution of an alkylbenzene sulfonic acid, with an average chain length distribution of 11.3 carbons, dissolved in water was prepared. When the heterogeneous solution containing furfuryl alcohol, polyvinyl alcohol, and water was around 60° C. and while stirring, around 116 parts by mass of the 10 wt. % alkylbenzene sulfonic acid solution at 25° C. was added to the first reaction vessel containing furfuryl alcohol, polyvinyl alcohol, water, to form a new solution of furfuryl alcohol, polyvinyl alcohol, water, and alkylbenzene sulfonic acid. The addition of the 10 wt. % alkylbenzene sulfonic acid aqueous solution initiated the polymerization, which was allowed to continue for 1 hour at 60° C. while stirring. After 1 hour, the reaction vessel was then heated to 80° C. and held at that temperature for 44 hours while stirring. Afterward, the solution was allowed to cool to room temperature and the solid polymer product was separated from the liquid phase and analyzed. In this example, the final median particle size was found to be 2.64 µm and the final percent coefficient of variation was found to be 23.7%.

Working Example #8

6.66 parts by mass of a polyvinyl alcohol compound with a hydrolysis percent of around 80% (percent of hydrolysis equals percent of acetate groups converted to alcohol groups) and a viscosity of around 38 to 42 mPa·s when measured as a 4 wt. % aqueous solution at 20° C., was added to a first reaction vessel containing 910 parts by mass of water while stirring. Next, the first reaction vessel containing water and polyvinyl alcohol was heated to an internal temperature of 80° C. for 4 hours to form a heterogeneous solution or polyvinyl alcohol dispersed in water. After four hours, the polyvinyl alcohol in water solution was allowed to cool down to 25° C. to form a transparent homogeneous solution of dissolved polyvinyl alcohol in water. Next, 202 parts by mass of a furfuryl alcohol with a cloudpoint less 7.3° C. was added to the first reaction vessel while mixing. The first reaction vessel containing the homogenous solution of polyvinyl alcohol, furfuryl alcohol, and water was heated to 60° C. Separately, in a second reaction vessel, a 10 wt. % aqueous solution of an alkylbenzene sulfonic acid, with an average chain length distribution of 10.3 carbons, dissolved in water was prepared. When the homogeneous solution containing furfuryl alcohol, polyvinyl alcohol, and water was around 60° C. and stirring, around 116 parts by mass of the 10 wt. % alkylbenzene sulfonic acid solution at 25° C. was added to the first reaction vessel containing furfuryl alcohol, polyvinyl alcohol, water, to form a new solution of furfuryl alcohol, polyvinyl alcohol, water, and alkylbenzene sulfonic acid. The addition of the 10 wt. % alkylbenzene sulfonic acid aqueous solution initiated the polymerization, which was allowed to continue for 1 hour at 60° C. while stirring. After 1 hour, the first reaction vessel was then heated to 80° C. and held at that temperature for 4 hours while stirring. Afterward, the solution was allowed to cool to room temperature and the solid polymer product was separated from the liquid phase and analyzed. In this example, the final median particle size was found to be 2.47 µm and the final percent coefficient of variation was found to be 11.36%.

Working Example #9

4.79 parts by mass of a polyvinyl alcohol compound with a hydrolysis percent of around 80% (percent of hydrolysis equals percent of acetate groups converted to alcohol groups) and a viscosity of around 38 to 42 mPa·s when measured as a 4 wt. % aqueous solution at 25° C. was added to a first reaction vessel containing 911 parts by mass of water while stirring. Next, the first reaction vessel containing water and polyvinyl alcohol was heated to an internal temperature of 50° C. for 14 hours to form a heterogeneous solution or polyvinyl alcohol dispersed in water. Next, 379.6 parts by mass of lower purity furfuryl alcohol (<98.5% furfuryl alcohol by GC) was added to the first reaction vessel while mixing. The first reaction vessel containing the heterogeneous solution of polyvinyl alcohol, furfuryl alcohol, and water was heated to 50° C. and allowed to mix and homogenize for 4 hours. Separately, in a second reaction vessel, a 2 wt. % aqueous solution of an alkylbenzene sulfonic acid, with an average chain length distribution of 10.3 carbons, dissolved in water, was prepared at 80° C. The two solutions were pumped in equal volumetric flow rates and heated to 80° C. The two solutions mixed together in a wye with a static mixer assembly to form a new solution of furfuryl alcohol, polyvinyl alcohol, water, and alkylbenzene sulfonic acid. The introduction of the alkylbenzene sulfonic acid initiated the polymerization, and the combined solution polymerized while traveling through a static flow reactor assembly with a residence time of 5 minutes and the temperature controlled to 80° C. The polymerization reaction exited the flow reactor and was collected in a third reaction vessel with active stirring. Once the third reaction vessel was filled, the solution was heated to 80° C. and held at that temperature for 12 hours while stirring. Afterward, the solution was allowed to cool to room temperature and the solid polymer product was separated from the liquid phase and analyzed. In this example, the final median particle size was found to be 2.18 µm, the final mode particle size was found to be 2.19 µm, and the final percent coefficient of variation was found to be 16.5%

Working Example #10

Spherical particles of polyfurfuryl alcohol obtained from Working Example #1 were heated to a temperature of about 900° C. under a 100% argon atmosphere and held at that temperature for 1 hour, then cooled back down to room temperature. The results of this process stage (e.g., pyrolysis) produced carbon particles with a median particle size of 2.17 µm, a particle size mode equal to 2.11 µm, a percent coefficient of variation equal to 4.43%, a specific surface area of 469 m2/g, and pore size diameters existing in the microporous (<2 nm) and mesoporous (2 nm-50 nm) ranges.

Working Example #11

Spherical carbon particles obtained from Working Example #11 were heated to a temperature of about 1000° C. under a carbon dioxide atmosphere and held at that temperature for 5 hours to obtain spherical activated carbon. The results of this process stage (e.g., activation) produced spherical activated carbon particles with a specific surface area of around 2200 m$^2$/g.

Many electrochemical energy-storage or energy-conversion applications may benefit from utilizing polymer-derived composite particles in their electrode formulations. For example, batteries (e.g., Li-ion batteries) with so-called intercalation-type or conversion-type or mixed cathode active materials or with intercalation-type or conversion-type or mixed active anode materials may support reasonably fast charge and discharge rates (e.g., charging to around 80% of the maximum capacity within around 10-60 minutes). Yet, in some applications (e.g., for even faster rate performance (e.g., charging to around 80% of the maximum capacity within around 1-600 seconds) or for better cycle stability or for better calendar life or for better performance at low or at high temperatures or for reduced reactivity with electrolyte or for higher capacity utilization or for other performance gains), it may be advantageous to produce composite particles comprising such active materials and use them in the electrodes for batteries (e.g., Li-ion or Na-ion batteries, among others). In some designs, such composites may be effectively produced using a polyfurfuryl alcohol as one of the precursor input materials (e.g., including polyfurfuryl alcohol-derived carbon). Indeed, in some designs it may further be advantageous for such active material-comprising composites (e.g., in the form of composite particles) to comprise conductive (e.g., $sp^2$-bonded) carbon due to carbon's high electrical conductivity, acceptable mobility for Li and other ions, good mechanical properties and good chemical and electrochemical resistance. In some designs, it may be advantageous for such composites (e.g., in the form of composite particles) comprising both active (ion storing) materials (e.g., including, but not limited to intercalation-type materials, conversion-type materials including alloying type materials, pseudocapacitive materials, mixed-type active materials, etc.) and carbon to have a meaningful weight fraction of (non-carbon) active materials. In some designs, the fraction of such active materials in respective composite particles may preferably range from around 20 wt. % to around 98 wt. % (in some designs, from around 20 wt. % to around 40 wt. %; in other designs, from around 40 wt. % to around 60 wt. %; in yet other designs, from around 60 wt. % to around 80 wt. %; in yet other designs, from around 80 wt. % to around 98 wt. %) in as-produced or as-used for electrode or battery assembling stage. In some designs, the weight ratio of active material to carbon may preferably range from around 1:4 to around 50:1 (in some designs, from around 1:1 to around 20:1). In some designs, too low fraction of active materials may lead to undesirably low volumetric capacity, while too high fraction of active materials may lead to reduced rate and stability.

Note that in some designs, instead of or in addition to pure intercalation-type active materials or pure conversion-type active materials, mixed materials that experience both intercalation and conversion-type electrochemical reactions may be utilized. In some designs, intercalation-type active material within the electrodes may be in the form of the individual particles bonded together (e.g., with a binder and optional conductive additives) to form an electrode or in the form of composite particles that comprise intercalation-type active material, where particles may be similarly bonded together to form an electrode. Similarly, in some designs, conversion-type active material within the electrodes may be in the form of the individual particles bonded together (e.g., with a binder and optional conductive additives) to form an electrode or in the form of composite particles that comprise conversion-type active material, where particles may be similarly bonded together to form an electrode. In some designs, electrodes may be purposely comprised more than one material or material type (e.g., comprise both intercalation-type active material and conversion-type active material, e.g., a 'blend' of active material particles of different types). In some designs, the particles comprising intercalation-type active material and the particles comprising conversion-type active material may exhibit sufficiently different sizes and/or BET specific surface area. In addition to conversion-type and intercalation-type active materials, some of the materials may be of pseudocapacitive-type or at least experience pseudocapacitive reactions in addition to other energy storage electrochemical reaction mechanisms.

In some designs (e.g., for faster charging rate or for improved stability, etc.) it may be advantageous for polyfurfuryl alcohol-derived carbon comprising composites (e.g., carbon comprising composite particles) with (non-carbon) active materials to comprise pores. In some designs, it may be advantageous for the pore volume in the composite to range from around 0.01 $cm^3/g$ to around 2.0 $cm^3/g$ (in some designs, from around 2 vol. % to around 75 vol. %), depending on the volume changes in (non-carbon) active materials during cycling, ionic conductivity of the composite components, degree of side reactions with electrolyte at operating conditions and other factors. In some designs (e.g., when volume changes in active materials are small and when side reactions are moderate, it may be advantageous for at least some portion (e.g., around 0.1-100 vol. %) of all the pores in the composites to be accessible to electrolyte while the electrode composition is made part of an energy storage device cell. In some designs, it may be advantageous for at least some portion (e.g., around 1-100 vol. %) of the pores to be interconnected to neighboring pores and accessible from the center of the composite particles. In some designs, it may be advantageous for at least some portion (e.g., around 1-100 vol. %) of the pores to exhibit characteristic dimensions (e.g., diameter or width) in the range from around 0.3 nm to around 600 nm. In some designs, it may be advantageous (e.g., to maximize volumetric capacity of the electrodes, while attaining high-rate performance) for at least some fraction (e.g., around 0.1-30 vol. %) of all the pores (inclusive of both electrolyte-accessible pores and pores that are inaccessible to electrolyte when the electrode composition is made part of an energy storage device cell) to exhibit characteristic dimensions in the range from around 10 nm to around 100 nm. In some designs, it may be advantageous (e.g., to maximize volumetric capacity of the electrodes or to improve stability) for at least some fraction (e.g., around 30-100 vol. %) of all the pores (inclusive of both electrolyte-accessible pores and pores that are inaccessible to electrolyte when the electrode composition is made part of an energy storage device cell) to exhibit characteristic dimensions in the range from around 0.3 nm to around 10 nm. In some designs, it may be advantageous (e.g., to maximize volumetric capacity of the electrodes or to improve stability) for at least some fraction (e.g., around 10-100 vol. %; in some designs around 30-100 vol. %—such as around 30-40 vol. % or around 40-50 vol. % or around 50-60 vol. % or around 60-70 vol. % or around 70-80 vol. or around 80-90 vol. % or around 90-100 vol. %) of all the pores (in composites) to exhibit characteristic dimensions in the range from around 0.3 nm to around 6 nm. In some designs (e.g., when active materials exhibit small (e.g., around 0.1-10 vol. %) or moderate (e.g., around 10-120 vol. %) volume changes during cycling and when one needs to maximize volumetric capacity of the electrodes and volumetric energy storage characteristics), it may be advantageous for the volume fraction of all the pores in such composites to be small (e.g., around 0.001-5 vol. %) or moderate (e.g., around 5-20 vol. %). In some designs (e.g., to maximize energy storage characteristics, such as power or energy density or cycle stability or achieve a compromise between these or other characteristics), it may be advantageous for the so-called Brunauer-Emmett-Teller (BET) specific surface area (SSA) or density functional theory (DFT) SSA of the composite electrode materials (particles) (e.g., as measured using $N_2$ or Ar or $CO_2$ or $H_2$ sorption technique and analyzed using BET or DFT methods) to range from around 0.25 $m^2/g$ to around 1000 $m^2/g$ (in some designs, from around 0.25 $m^2/g$ to around 2 $m^2/g$; in other designs, from around 2 $m^2/g$ to around 10 $m^2/g$; in other designs, from around 10 $m^2/g$ to around 40 $m^2/g$; in other designs, from around 40 $m^2/g$ to around 100 $m^2/g$; in other designs, from around 100 $m^2/g$ to around 400 $m^2/g$; in other designs, from around 400 $m^2/g$ to around 1000 $m^2/g$, depending on the type of (non-carbon) active material and electrolyte used and depending on the desired characteristics of the battery cells, among other factors). In some designs, larger SSA may allow faster charge or discharge rate performance, but may also lead to higher fraction (rate) of some undesirable side reactions (e.g., with electrolyte). In some designs, the rate of such undesirable (e.g., leading to self-discharge or to gassing or to formation of deposits or to the irreversible consumption of electrolyte or to electrode or cell swelling, faster degradation, etc.) reactions may depend on the operating electrode potential, operating temperature, and electrolyte composition, among other factors. In some designs, the acceptable rates depend on the particular application. However, for many electrolyte systems and for most cell designs and applications, it may generally be preferable for the BET SSA to range from around 0.25 $m^2/g$ to around 1000 $m^2/g$. In some designs, it may be preferable for the BET SSA to range from around 1 $m^2/g$ to around 100 $m^2/g$.

In some designs (particularly for higher BET SSE composites), it may be advantageous for the active (e.g., intercalation-type or conversion-type or mixed-type) materials to be protected (e.g., from undesirable interactions with electrolyte) by a protective surface (e.g., shell or pore-plugging) layer. In some designs, the suitable thickness (e.g., average thickness) of the protective surface layer may range from around 0.3 nm to around 60 nm. In some designs, smaller thickness may be less effective for some applications, while larger thickness may lead to reduced rate performance of reduced volumetric and gravimetric energy densities for some applications. In some designs, the protective surface layer may directly coat at least a portion (e.g., around 1-100% of the outer surface area) of the active material(s)/particle(s) that otherwise would be exposed to electrolyte during at least some time of the battery assembling or operation. In some examples, the protective surface layer may comprise carbon. In some examples, the protective surface layer may comprise an oxide, a fluoride, an oxyfluoride, a sulfide, a nitride, an oxynitride, a nitride fluoride, a phosphate, a fluoro-phosphate (phosphate fluoride), or another material that comprises atoms of metals or semi-metals. In some designs, the protective surface layer material may comprise one or more of the following elements: transition, alkali or alkaline-earth metal (such as iron (Fe), manganese (Mn), copper (Cu), yttrium (Y), zirconium (Zr), niobium (Nb), molybdenum (Mo), chromium (Cr), lithium (Li), sodium (Na), magnesium (Mg), potassium (K), calcium (Ca), strontium (Sr), cesium (Cs), barium (Ba), among others), lanthanum or lanthanoids (La, Ce, Gd, Nd, Eu, etc.), beryllium (Be), aluminum (Al), silicon (Si), gallium (Ga), germanium (Ge), phosphorous (P), arsenic (As), tin (Sn), bismuth (Bi), lead (Pb), indium (In), cadmium (Cd), zinc (Zn), fluorine (F), iodine (I), oxygen (O), nitrogen (N), sulfur (S), selenium (Se), tellurium (Te), hydrogen (H) and carbon (C).

In some designs (e.g., to maximize electrode uniformity and battery stability), it may be advantageous for polyfurfuryl alcohol-derived carbon comprising composite electrode particles to exhibit volume-average characteristics dimensions (e.g., diameter) in the range from around 5 nanometers (nm) to around 150 microns (in some designs, from around 200 nm to around 30 microns), as measured using a scanning electron microscope (SEM) or a laser particle size analyzer or a combination of several characterization techniques and numerical analyses/modeling. In some designs, too small of a particle size may lead to difficulties achieving high packing density for some applications. At the same time, in some designs, a high-volume fraction of smaller participates may also result in small interparticle pore size, which may slow down rate performance in the electrode and lead to faster cell degradation in some designs (e.g., particularly, if batteries are operating at faster rates or at lower temperatures). In some designs, too large of an average particle size, on the other hand, may lead to local variations in the electrode capacity loading and result in faster cell degradation in some designs (e.g., particularly if the battery is operating at lower temperatures or at faster rates). In some designs, the composite particle size, the interconnectivity of the pores in the composite as well as the ionic and electronic transport within the composite materials may affect the particle-level rate performance. In some designs, too large of an average particle size may also result in poor (or insufficiently good for a given application) charge or discharge rate performance. While various electrode and electrolyte properties, battery cell operational conditions (e.g., current, rate, temperature, charge voltage, electrode operating potential, etc.), porosity and shape of the composite particles and other parameters affect optimal composite particle size, it is advantageous in some designs for such composite electrode particles to exhibit volume-average characteristic dimensions in the range from around 200 nm to around 30 microns (in some designs—from around 0.2 micron to around 1 micron; in other designs from around 1 to around 2 micron; in yet other designs from around 2 microns to around 5 microns; in yet other designs from around 5 microns to around 10 microns; in yet other designs from around 10 microns to around 30 microns). In some designs, suitable electrode-level porosity (e.g., mostly—the volume fraction of the space in the electrode filled by the electrolyte) may be affected by the volume fraction of the binder, volume fraction of conductive and other additive and volume fraction of active (composite) particles (and their open porosity), electrolyte conductivity, electrode thickness, battery operation and other properties. In some designs, such porosity may also change during cycling if active materials or composites comprising active material exhibit substantial volume changes during cycling. However, in some designs, values of such porosity ranging from around 1 vol. % to around 75 vol. % (e.g., in some designs—after 0-10 cycles of so-called battery "formation" and quality control stages; in some designs—after electrode assembling/calendaring and prior to electrolyte infiltration in cells) are acceptable or advantageous for some applications (in some designs—from around 1 vol. % micron to around 10 vol. %; in other designs from around 10 vol. % to around 20 vol. %; in yet other designs from around 20 vol. % to around 30 vol. %; in yet other designs from around 30 vol. % to around 40 vol. %; in yet other designs from around 40 vol. % to around 50 vol. %; in yet other designs from around 50 vol. % to around 60 vol. %; in yet other designs from around 60 vol. % to around 75 vol. %). In some designs, smaller volume fraction may lead to slow charging or discharging rates and faster cell degradation in some applications. In some designs, larger fraction may undesirably reduce volumetric energy density, rate performance and increase battery costs in some applications. In some designs, the volume fraction of the electrode occupied (filled) with a suitable electrolyte may advantageously range from around 1 vol. % to around 75 vol. %. In some designs, the suitable volume fraction of the electrode occupied (filled) with a suitable electrolyte may even be in narrower range, from around 5 vol. % to around 60 vol. % (or even in a narrower range, for example, from around 10 vol. % to around 40 vol. %).

In some designs, a large portion (e.g., around 70-100 vol. %) of (non-carbon) active material within polyfurfuryl alcohol-derived carbon comprising composite electrode particles may be in the form of smaller particles (rather than, e.g., in the form of the continuous or discontinuous coatings or in the form of a porous unibody that is filled with carbon or other (inactive or less active) materials). In some designs, the volume-average size of active material particles (e.g., within the carbon comprising composite electrode particles) may advantageously range from around 0.5 nm to around 200 nm (in some designs, from around 0.5 nm to around 5 nm; in other designs, from around 5 nm to around 10 nm; in yet other designs, from around 10 nm to around 20 nm; in yet other designs, from around 20 nm to around 40 nm; in yet other designs, from around 40 nm to around 60 nm; in yet other designs, from around 60 nm to around 100 nm; in yet other designs, from around 100 nm to around 200 nm). Too large size may not provide sufficiently fast electrochemical reactions in some designs, while too small size may lead to undesirable side-reactions or too small mass loadings of active material particles within such composites, thus limiting energy characteristics of the energy storage devices built with these composite particles in some designs. In some designs, the volume-average size of crystalline grains of active material particles (e.g., within the prepared carbon comprising composite electrode particles) may advantageously range from around 0.5 nm to around 200 nm (in some designs, from around 0.5 nm to around 5 nm; in other designs, from around 5 nm to around 10 nm; in other designs, from around 10 nm to around 20 nm; in yet other designs, from around 20 nm to around 40 nm; in yet other designs, from around 40 nm to around 60 nm; in yet other designs, from around 60 nm to around 100 nm; in yet other designs, from around 100 nm to around 200 nm), as analyzed using diffraction or scattering techniques (e.g., X-ray diffraction, XRD) or transmission electron microscopy (TEM).

Conventional active cathode materials utilized in Li and Li-ion batteries may be of an intercalation-type. Metal ions are intercalated into and occupy the interstitial positions of such materials during the charge or discharge of a battery. Such cathode materials typically experience very small volume changes (e.g., about 0.1-8 vol. %) when used in battery electrodes during charge and discharge. However, such cathodes exhibit relatively small gravimetric and volumetric reversible capacities (e.g., less than around 200-220 mAh/g and less than around 1000 mAh/cm$^3$, respectively). Illustrative examples of suitable intercalation-type active cathode materials that may be utilized in the context of this disclosure include, but are not limited to: lithium nickel cobalt aluminum oxides (NCA—e.g., $LiNi_{0.8}Co_{0.15}Al_{0.05}O_2$, or $LiNi_xCo_yAl_zO_2$, where typically x+y+z≤1, which may additionally comprise metals other than Co and Al for enhanced performance or reduced Co content), lithium nickel cobalt manganese aluminum oxides (NCMA), lithium nickel oxides (LNO—e.g., $LiNiO_2$ or others, which may also comprise metals other than Ni for enhanced stability), various lithium manganese oxides (LMO—e.g., $LiMnO_2$ or LMO, or $Li_2MnO_3$, or $LiMn_2O_4$, among others), lithium nickel manganese cobalt oxides (NCM—e.g., $LiNi_{0.33}Co_{0.33}Mn_{0.33}O_2$, or $LiNi_{0.8}Co_{0.1}Mn_{0.1}O_2$ or, more generally, $LiNi_xCo_yMn_zO_2$, where typically x+y+z≤1, or NCM, or NMC), lithium nickel manganese oxide ($LiNi_{0.5}Mn_{0.5}O_2$, or $LiNi_xMn_yO_2$, where typically x+y≤1, or NMO, which may also comprise metals other than Ni and Mn for enhanced stability), lithium cobalt oxide (LCO—e.g., in the form of $LiCoO_2$ or $LiCo_2O_4$), lithium cobalt aluminum oxides (LCAO), lithium manganese phosphate (LMP), lithium titanium sulfite ($LiTiS_2$), or lithium iron phosphate ($LiFePO_4$, LFP), lithium manganese phosphate ($LiMnPO_4$), lithium manganese iron phosphate (LMFP), lithium cobalt phosphate ($LiCoPO_4$), lithium nickel phosphate ($LiNiPO_4$), lithium vanadium fluoro phosphate ($LiVFPO_4$), lithium iron fluoro sulfate ($LiFeSO_4F$), various Li excess materials (e.g., lithium excess (rocksalt) transition metal oxides and oxy-fluorides such as $Li_{1.211}Mo_{0.467}Cr_{0.3}O_2$, $Li_{1.3}Mn_{0.4}Nb_{0.3}O_2$, $Li_{1.2}Mn_{0.4}Ti_{0.4}O_2$, $Li_{1.2}Ni_{0.333}Ti_{0.333}Mo_{0.133}O_2$ and many others), various high capacity Li-ion based materials with partial substitution of oxygen for fluorine or iodine (e.g., rocksalt $Li_2Mn_2/3Nb_1/3O_2F$, $Li_2Mn_1/2Ti_1/2O_2F$, $Li_{1.5}Na_{0.5}MnO_{2.85}I_{0.12}$, among others) and many other types of Li-containing disordered, layered, tavorite, olivine, or spinel type active materials or their mixtures comprising at least oxygen or fluorine or sulfur and at least one transition metal and other lithium transition metal (TM) oxides or phosphates or sulfates (or mixed) cathode materials that rely on the intercalation of lithium (Li) and changes in the TM oxidation state. In some designs, such materials may be doped or heavily doped. In addition to Li-based, other examples of intercalation-type active materials may be based on (e.g., similar) Na-ion intercalation compounds, K-ion intercalation compounds, Ca-ion intercalation compounds, among others. In addition to Li-containing (or Na-containing, K-containing, Ca-containing, etc.) intercalation compounds, Li-free (or Na-free, K-free, Ca-free, etc.) version(s) of such or similar materials may be utilized (e.g., titanium oxide or oxyfluoride, niobium oxide or oxyfluoride, cobalt oxide or oxyfluoride, nickel oxide or oxyfluoride, nickel-aluminum oxide or oxyfluoride, nickel-cobalt-manganese oxide or oxyfluoride, nickel-cobalt-aluminum oxide or oxyfluoride, iron oxide or oxyfluoride, iron phosphate, many others and their various mixtures, etc.).

In addition to or instead of intercalation-type active materials, some designs of the present disclosure may comprise so-called pseudocapacitive (or mixed pseudocapacitive-intercalation-type) active materials. Suitable examples of pseudocapacitive (or mixed pseudocapacitive-intercalation-type) active materials include, but are not limited to, various (including mixed metal) oxides, hydroxides, oxyhydroxides, nitrides, oxynitrides, nitrates, phosphates, (oxy) phosphates, sulfides, sulfate hydroxide and other inorganic salts of Ru, Fe, Mn, Cu, Ti, Bi, V, Ni, Nb, Ce, Zr, Ta, Co, Sn, Sb, Si, In, Zn, Mo, Pb, La, Y and their various mixtures and derivatives. Such compounds may also comprise Li, Na, Ca, Cs, Mg and K. In some designs, such compounds may comprise two, three, four or more metals. In some designs, such compounds may comprise at least one transition metal.

Conventional anode materials utilized in Li-ion batteries are also of an intercalation-type, whereby metal ions are intercalated into and occupy interstitial positions of such materials during the charge or discharge of a battery. Such anodes experience small or very small volume changes when used in electrodes (e.g., around 0.05-10 vol. %). However, such anodes exhibit relatively small gravimetric and volumetric reversable capacities (e.g., typically less than around 200 mAh/g in case of lithium titanate (LTO) and typically less than around 370-400 mAh/g rechargeable specific capacity in the case of lithium vanadate, graphite- or hard carbon-based anodes and less than around 600 mAh/cm$^3$ rechargeable volumetric capacity at the electrode level without considering the volume of the current collector foils).

Conversion-type active cathode materials may offer significantly higher specific capacities than intercalation-type materials. Suitable examples of these include, but are not limited to, metal fluorides, metal chlorides, metal sulfides, metal selenides, their various mixtures, composites and others. For example, fluoride-based cathodes may offer outstanding technological potential due to their very high capacities, in some cases exceeding around 300 mAh/g (greater than around 1200 mAh/cm$^3$ at the electrode level). For example, in a Li-free state, $FeF_3$ offers a theoretical specific capacity of 712 mAh/g; $FeF_2$ offers a theoretical specific capacity of 571 mAh/g; $MnF_3$ offers a theoretical specific capacity of 719 mAh/g; $CuF_2$ offers a theoretical specific capacity of 528 mAh/g; $NiF_2$ offers a theoretical specific capacity of 554 mAh/g; $PbF_2$ offers a theoretical specific capacity of 219 mAh/g; $BiF_3$ offers a theoretical specific capacity of 302 mAh/g; $BiF_5$ offers a theoretical specific capacity of 441 mAh/g; $SnF_2$ offers a theoretical specific capacity of 342 mAh/g; $SnF_4$ offers a theoretical specific capacity of 551 mAh/g; $SbF_3$ offers a theoretical specific capacity of 450 mAh/g; $SbF_5$ offers a theoretical specific capacity of 618 mAh/g; $CdF_2$ offers a theoretical specific capacity of 356 mAh/g; $ZnF_2$ offers a theoretical specific capacity of 519 mAh/g; $AlF_3$ also offers a high theoretical capacity, although at low lithiation potential. AgF and $AgF_2$ offer theoretical specific capacities too and additionally exhibit very high lithiation potential. Mixtures (for example, in the form of alloys) of fluorides may typically offer a theoretical capacity approximately calculated according to the rule of mixtures. The use of mixed metal fluorides may sometimes be advantageous (e.g., may offer higher rates, lower resistance, higher practical capacity, or longer stability). The use of metal fluorides mixed with metals may also sometimes be advantageous (e.g., may offer higher rates, lower resistance, higher practical capacity, or longer stability). In a fully lithiated state, metal fluorides convert to a composite comprising a mixture of metal and LiF clusters (or nanoparticles). Examples of the overall reversible reactions of the conversion-type metal fluoride cathodes may include $2Li+CuF_2 \leftrightarrow 2LiF+Cu$ for $CuF_2$-based cathodes or $3Li+FeF_3 \leftrightarrow 3LiF+Fe$ for $FeF_3$-based cathodes. It will be appreciated that metal fluoride-based cathodes may be prepared in Li-free or partially lithiated or fully lithiated states. In addition to fluorides, other illustrative examples of conversion-type active electrode materials may include, but are not limited to, various metal oxy-fluorides, sulfo-fluorides, chloro-fluorides, oxy-chloro-fluorides, oxy-sulfo-fluorides, fluoro-phosphates, sulfo-phosphates, sulfo-fluoro-phosphates, mixtures of metals (e.g., Fe, Cu, Ni, Co, Bi, Cr, other metals, their various mixtures and alloys, partially oxidized metals and metal alloys, etc.) and salts (metal fluorides (including LiF or NaF), metal chlorides (including LiCl or NaF), metal oxy-fluorides, metal oxides, metal sulfo-fluorides, metal fluoro-phosphates, metal sulfides, metal oxy-sulfo-fluorides, their various combinations, etc.), and other salts that comprise halogen or sulfur or oxygen or phosphorous or a combination of these elements, among others. In some designs, F in metal fluorides may be fully or partially replaced with another halogen (e.g., Cl or Br or I, etc.) or their mixtures to form the corresponding metal chlorides or metal fluoride-chlorides and other metal halide compositions. In some designs, metal halides may be at least partially dissolved in the electrolyte. In some designs, at least a portion of active material may be stored in a liquid form (e.g., in electrolyte).

Yet another example of a promising conversion-type cathode (or, in some cases, anode) material is sulfur (S) (in a Li-free state) or lithium sulfide ($Li_2S$, in a fully lithiated state). In some designs, selenium (Se) may also be used together with S or on its own for the formation of such cathode active materials.

In some designs, conversion-type active cathode materials may also advantageously comprise metal oxides or mixed metal oxides. In some designs, such (nano)composites may advantageously comprise metal sulfides or mixed metal sulfides. In some examples, mixed metal oxides or mixed metal sulfides may comprise lithium. In some examples, mixed metal oxides may comprise titanium or vanadium or manganese or iron metal. In some examples, lithium-comprising metal oxides or metal sulfides may exhibit a layered structure. In some examples, metal oxides or mixed metal oxides or metal sulfides or mixed metal sulfides may advantageously be both ionically and electrically conductive (e.g., in the range from around $10^{-7}$ to around $10^{+4}$ S/cm). In some examples, various other intercalation-type active materials may be utilized instead of or in addition to metal oxides or metal sulfides. In some designs, such an intercalation-type active material exhibits charge storage (e.g., Li insertion/extraction capacity) in the potential range close to that of S or $Li_2S$ (e.g., within around 1.5-3.8 V vs. $Li/Li^+$).

In some designs, the use of so-called Li-air cathodes (e.g., cathodes with active material in the form of $Li_2O_2$, $Li_2O$, LiOH in their lithiation state) or similar metal-air cathodes based on Na, K, Ca, Al, Fe, Mn, Zn and other metals (instead of Li) may similarly be beneficial due to their very high capacities. In some designs, such cathode active materials should ideally reversibly react with oxygen or oxygen containing species in the electrochemical cell and may fully disappear upon full de-lithiation (metal removal). These are also considered to belong to conversion-type cathodes.

Conversion-type anodes may offer specific capacities much higher than graphitic carbon through reactions generalized by: $nLi+M_aX_b \leftrightarrow aM+bLi_nX$, where M may be a metal or semimetal (intermetallic), X is an anion (e.g., O in the case of anodes, but may also be N, S, P, F, etc.) or hydrogen (H). Suitable examples of such conversion-type active anode materials include, but are not limited to, various oxides, nitrides, sulfides, phosphides, fluorides, hydrides, etc. In some designs, these may include fully or partially oxidized non-carbon group IV elements (e.g., oxides or nitrides or sulfides or phosphides of Si, Ge, Sn or Pb) and fully or partially (e.g., oxides or nitrides or sulfides or phosphides) of Al, Ga, In, Sb, Bi, Fe, Ti, Mn, Cu, Ni, Co, V, and Zn, among others.

Alloying-type materials are sometimes considered a subclass of conversion-type active anode materials. These materials for use in Li-ion batteries also offer higher gravimetric and volumetric capacities compared to intercalation-type anodes. Alloying-type active anode materials also may offer lower irreversible first cycle losses compared to the described above conversion-type anode materials (such as various oxides, nitrides, sulfides, phosphides or hydrides, etc.). For example, Earth-abundant silicon (Si) offers approximately 10 times higher gravimetric capacity and approximately 3 times higher volumetric capacity compared to an intercalation-type graphite (or carbonaceous soft carbon, hard carbon or graphite-like) anode. In some designs, Si may be doped or heavily doped with nitrogen (N), phosphorous (P), boron (B) or other elements or be alloyed with various other metals. As previously described, in addition to Si-based active material, silicon oxides ($SiO_x$) or oxynitrides ($SiO_xN_y$) or nitrides ($SiN_y$) or hydrides or other Si element-comprising active material (including those that are partially reduced by Li or Mg) may be utilized. These offer lower capacity relative to Si but offer reduced volume changes and typically improved cycle stability, although commonly at the expense of higher first cycle losses or faster degradation or both. In addition to Si-based or Si-comprising active anode materials, other examples of such high capacity (e.g., nanocomposite) anodes comprising alloying-type (or, more broadly, conversion-type) active materials include, but are not limited to, those that are based on or comprise germanium (Ge), antimony (Sb), aluminum (Al), magnesium (Mg), zinc (Zn), gallium (Ga), arsenic (As), phosphorous (P), silver (Ag), cadmium (Cd), indium (In), tin (Sn), lead (Sb), bismuth (Bi), their various mixtures and alloys (with themselves or Si or other "inactive" metals, such as iron (Fe) or copper (Cu), among others), and others. Similarly, such materials may be doped or heavily doped and be in the form of oxides, oxynitrides, nitrides, hydrides or other metal or semi-metal comprising compounds.

In some designs, pure Li metal may be used as active anode material in some aspects of the present disclosure (e.g., for use in combination of porous carbon materials in the anode). In some designs, such anodes may advantageously comprise other material(s) in addition to carbon and lithium metal (e.g., alloying or conversion-type anode materials, polymers, etc.). In some designs, such composites may be in the form of particles that are cast and formed into an electrode using a binder by suitable mechanism. In some designs, such Li metal—C composite anodes may at least partially form during the first charge (after the cell construction) using metal ions (e.g., Li ions) from the Li-containing cathode active material. For example, Li metal may plate (be electrodeposited) inside the pores of suitable carbon during the first charge. In some designs, it may be advantageous for at least a portion of such pores (e.g., around 10-100% of the pores) to remain free from electrolyte and available for Li metal deposition during cell operation. In some designs, pores within suitable porous carbon may be closed by forming a shell (a shell that encases the porous carbon or otherwise plugs any open pores) before or after the electrode fabrication. In some designs, solid electrolytes (e.g., polymer or inorganic or polymer-inorganic composite) may be advantageously utilized in order to reduce side reactions, reduce first cycle capacity losses, reduce Li-dendrite formation and/or improve cell safety.

Figure 15:
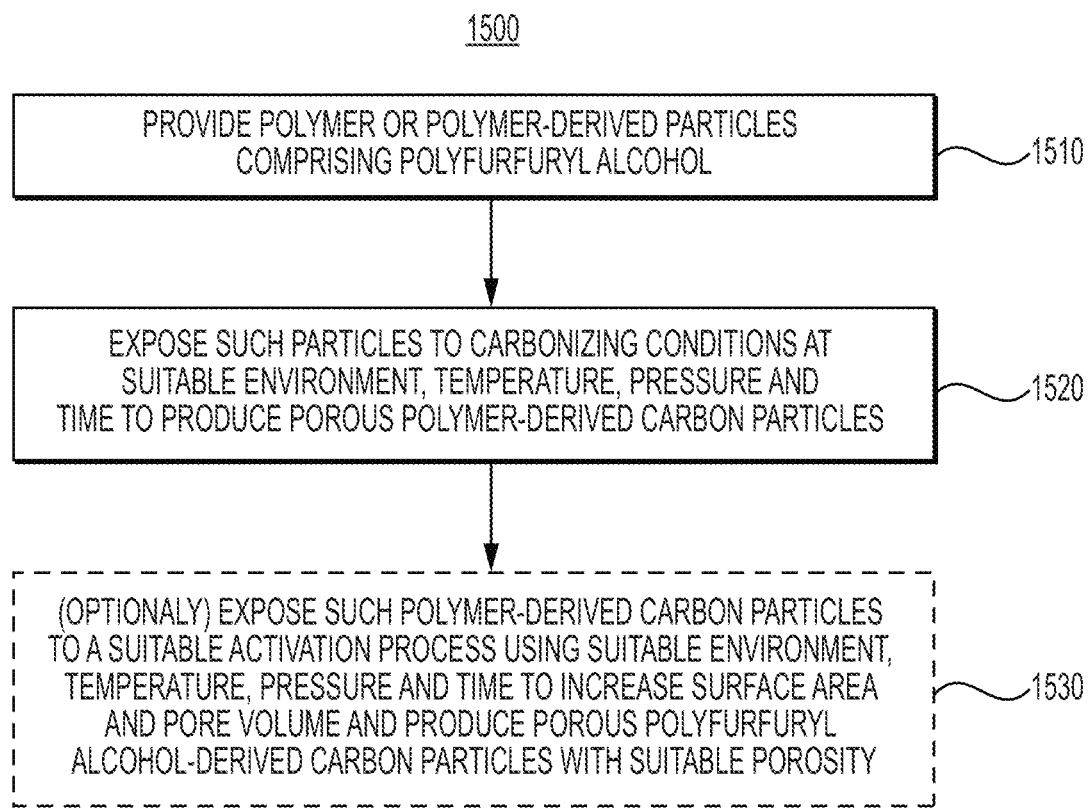
FIG. 15 illustrates a method of production of porous polyfurfuryl alcohol-derived carbon particles with suitable porosity.

FIG. 15 illustrates an exemplary method 1500 for the production of porous polyfurfuryl alcohol-derived carbon particles with suitable porosity for use in electrochemical (e.g., electrochemical energy storage or conversion) devices. Once the polyfurfuryl alcohol or polyfurfuryl alcohol-comprising particles are produced by suitable means (step 1510, e.g., as described in this disclosure), such particles may be exposed to carbonizing conditions (step 1520) in order to produce (typically porous) carbon particles. Illustrative examples of such suitable conditions may include exposure of polyfurfuryl alcohol or polyfurfuryl alcohol-comprising particles to heat-treatment (e.g., at temperatures in the range from around 500 to around 2500° C. for the time period in the range from about 10 sec to about 100 h, depending on the temperature and the desired degree of carbonization) under relatively inert environments (e.g., nitrogen or argon or helium gas or vacuum). In some designs, the polyfurfuryl alcohol or polyfurfuryl alcohol-comprising particles may be treated in air or oxygen or water-containing environments at lower (moderately elevated) temperatures (e.g., around 100-350° C.) prior to exposure to higher temperatures in an inert environment. In some designs, polyfurfuryl alcohol or polyfurfuryl alcohol-comprising particles may be hydrothermally treated (e.g., in the presence of catalysts at moderately elevated temperatures and elevated pressures) to induce their transformation to hydrochar particles before further conversion to carbon (e.g., by heat-treatment in an inert environment). In some designs, polyfurfuryl alcohol or polyfurfuryl alcohol-comprising particles may be mixed with chemical activation agents (e.g., an acid, such as phosphoric acid, among others, or an acidic or basic salt, such as ZnCl, among others or a base, such as KOH, among others) prior to at least some heat-treatment in order to enhance porosity of porous carbon particles. In order to increase porosity of polyfurfuryl alcohol-derived carbon particles, chemical or physical activation may be conducted after carbonization as well (step 1530). Physical activation typically exposes carbonized particles to $CO_2$ or $H_2O$ or their mixture at elevated temperatures (e.g., typically in the range from about 900° C. to about 1200° C.) in order to partially oxidize the carbon particles (e.g., transform some of the C atoms to CO or $CO_2$ gas) and increase pore volume and/or surface area of such carbon particles. Chemical activation, as mentioned before, typically involves mixing the carbon particles with activation agents and heating the mixture to elevated temperature. After chemical activation, particles may be purified with further treatments in order to remove traces or residues of the activation agents.

Figure 16:
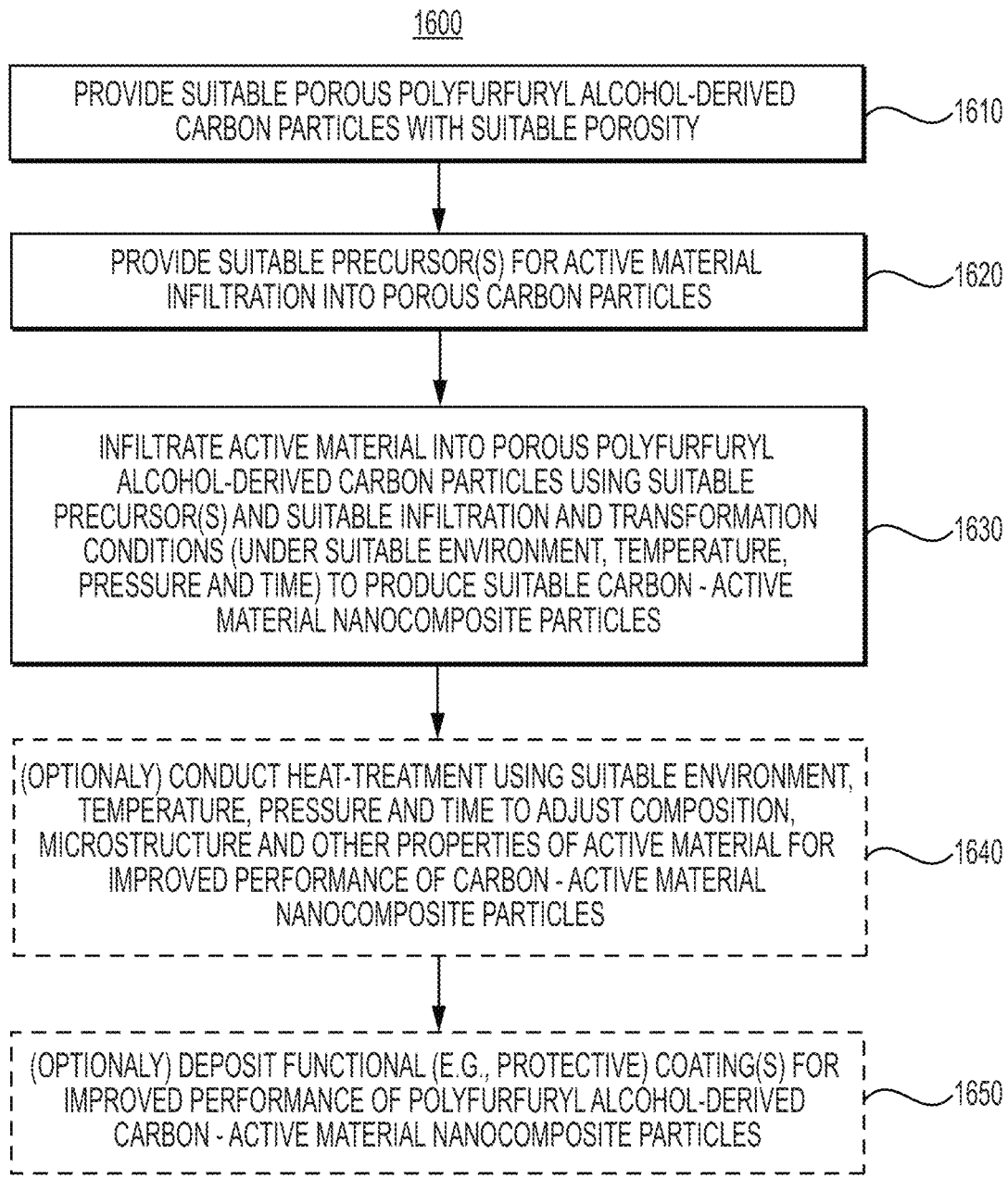
FIG. 16 illustrates a method of production of polyfurfuryl alcohol-derived carbon-active material nanocomposite particles for use as electrodes in electrochemical (e.g., electrochemical energy storage or conversion) devices.

FIG. 16 illustrates an exemplary method 1600 for the production of composite particles comprising active material and polyfurfuryl alcohol-derived carbon. Once the polyfurfuryl alcohol-derived porous carbon particles are produced by suitable means (e.g., as described above in this disclosure), such particles may be effectively used (step 1610) for the formation of (nano)composite particles for use in, for example, electrodes for electrochemical (e.g., energy storage or conversion) devices, such as batteries (e.g., Li-ion batteries), among others. Suitable active material (e.g., intercalation-type or conversion-type including alloying-type or mixed type in case of Li-ion battery application) may be infiltrated (step 1630) using a range of known precursors pre-selected for the most desirable process (step 1620). In some designs, the most suitable precursors may be selected and provided (step 1620) based on the infiltration method (e.g., gas-phase infiltration, such as chemical vapor deposition (CVD) or atomic layer deposition (ALD), etc. or solution-phase infiltration, etc.) and the desired morphology/composition of the final active material. In some designs, active materials may be deposited simply by a thermal decomposition of a precursor. For example, silicon (Si) active material for use in Li-ion battery anodes may be infiltrated into carbon pores by using $SiH_4$ precursor gas, which decomposes with the formation of Si. Other Si-containing precursors may also be utilized, as known in the field. In some designs, active material may be produced in several steps, which involves infiltration of an intermediate material, followed by one, two or more chemical transformation reactions (for example, infiltrating sulfur (S) followed by its chemical or electrochemical lithiation to produce $Li_2S$ or, for example, infiltrating iron (Fe) or iron oxide (e.g., $Fe_2O_3$) followed by their fluorination to produce ($FeF_3$), which may also be chemically or electrochemically lithiated to produce Fe/3LiF, to provide a few illustrating examples). Thus produced composite particles may be additionally heat-treated (step 1640) and/or coated with a functional surface layer or a shell (step 1650) to enhance their performance or stability. In some designs, steps (1630), (1640) and/or (1650) may be repeated more than once. In some designs, step (1630) may be repeated after step (1640). In some designs, the size of the active material particles in the produced composite particles may be defined by the pore size distribution in the polyfurfuryl alcohol-derived porous carbon particles. In some designs, it may be advantageous to have only a small fraction of active material on the outer surface of the composite particles (preferably less than around 10 wt. %, more preferably less than around 5 wt. %, most preferably less than around 1 wt. %), while infiltrating most of the active material (preferably over around 90 wt. %, more preferably over around 95 wt. %, most preferably more than around 99 wt. %) into the inner pores of the particles.

Figure 17:
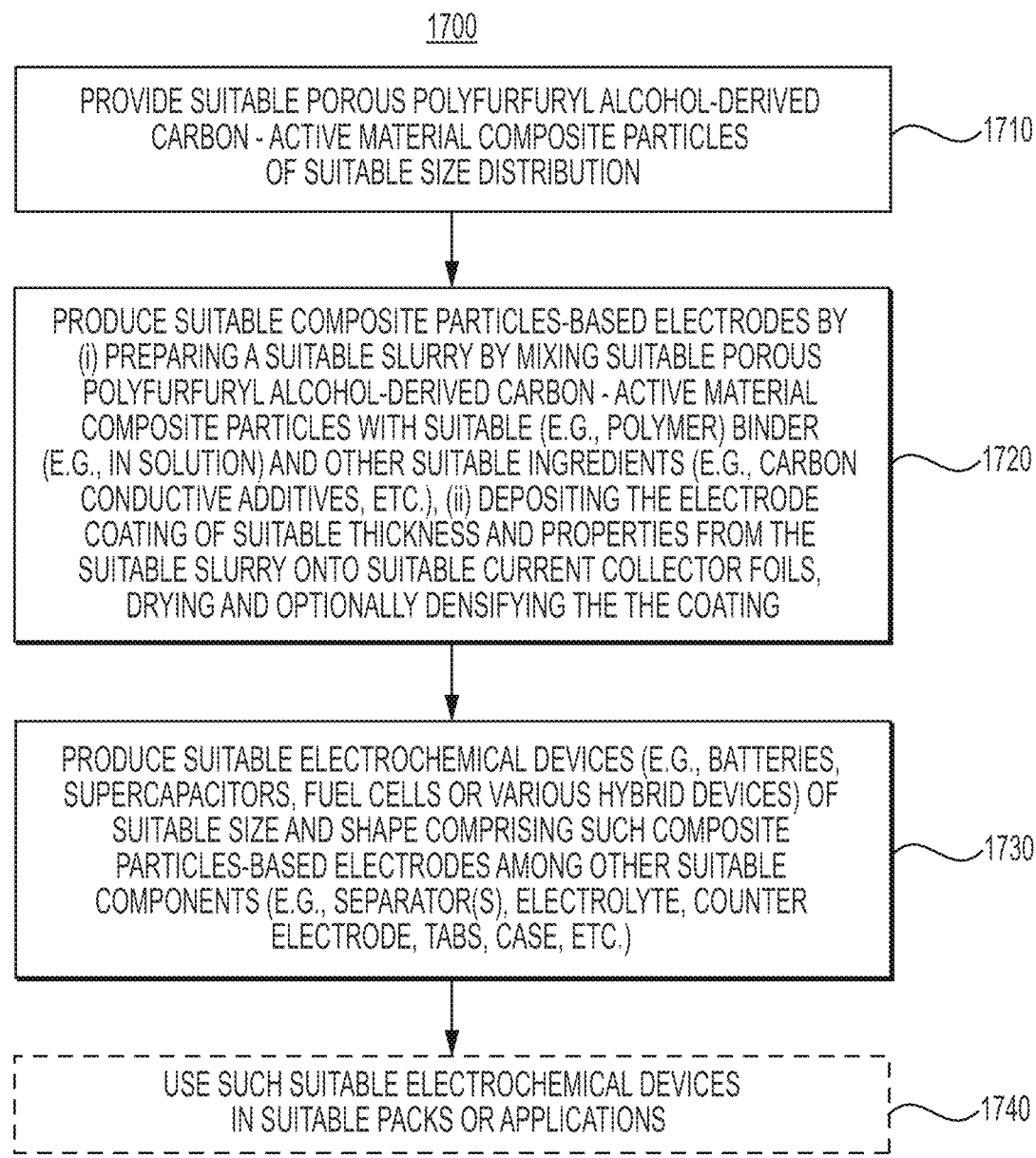
FIG. 17 illustrates a method of production of electrochemical (e.g., electrochemical energy storage or conversion) devices with some improved performance characteristics and their use in packs and applications (e.g., electric vehicles, drones, electric planes, grid storage, electronic devices, etc. with superior characteristics).

FIG. 17 illustrates an exemplary method 1700 for the formation of superior electrochemical devices (e.g., supercapacitors or batteries, such as Li-ion batteries, among others) as well as superior battery packs and final end products (e.g., improved electric scooters, electric bicycles, electric cars, electric trucks, electric buses, electric ships, electric planes and, more broadly, improved electric and hybrid electric ground, sea, and aerial (flying) vehicles (including heavy vehicles, autonomous vehicles, unmanned vehicles, planes, space vehicles, satellites, submarines, etc.), improved robots, improved stationary home or stationary utility energy storage units and improved other end products). Once the polyfurfuryl alcohol-derived carbon-active material composite particles are produced by suitable means (e.g., as described above in this disclosure), such particles may be provided and effectively used (step 1710) for the formation of electrodes for electrochemical (e.g., energy storage or conversion) devices, such as batteries (e.g., Li-ion batteries), among others (step 1720). In an exemplary process for the formation of Li-ion battery electrodes (step 1720), polyfurfuryl alcohol-derived carbon-active material composite particles are mixed with a solution of a known polymer binder (e.g., a salt of a polyacrylic acid (PAA), a salt of an alginic acid, carboxymethyl cellulose (CMC), styrene-butadiene rubber (SBR), or a polyvinyl alcohol (PVA), to provide a few illustrating examples) and, often, conductive (e.g., carbon additives), such as carbon black, carbon nanotubes, carbon nanofibers, graphene, exfoliated graphite, conductive carbides flakes, metal nanowires, to provide a few illustrating examples, and, in some designs, other functional additives, to make a uniform slurry. Such a slurry may then be coated onto a suitable current collector (e.g., copper or copper alloy foil for Li-ion battery anodes or aluminum or aluminum alloy foil for Li-ion battery cathodes, among other suitable current collectors known in the art), dried and, in some designs, densified (the process known as calendaring in the field). In some designs, composite particles, binder and conductive additives may also be deposited using a dry coating technique. In some (e.g., most) designs, the electrode coating is deposited on both sides of the current collector. Thus produced electrodes are then used for the fabrication of suitable electrochemical devices (1730). Most commonly, anode electrode/separator/cathode electrode/separator are stacked or rolled, dried, encased into a suitable case (e.g., a pouch or a coin or a cylindrical cell or a prismatic cell, etc.) and filled with an electrolyte. The cell is typically pre-sealed and subjected to one or more charge-discharge (so called "formation") cycle, degassed, sealed and tested for defects or performance variation prior to shipping to customers or assembling in a pack or using in a final device (step 1740).

This description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A method of particle fabrication, comprising:
mixing at least one stabilizing compound with an aqueous solution to produce a first mixture;
mixing furfuryl alcohol, a derivative of furfuryl alcohol, or a mixture thereof, into the first mixture to produce a second mixture;
heating the second mixture;
mixing a surfactant comprising an acid moiety and the second mixture to produce a third mixture; and
initiating a polycondensation reaction of the furfuryl alcohol, the derivative of the furfuryl alcohol, or the mixture thereof, in the third mixture to produce polymer or polymer-derived particles comprising polyfurfuryl alcohol.

2. The method of claim 1, further comprising:
defining or modifying a glass transition temperature of the polymer or polymer-derived particles comprising the polyfurfuryl alcohol.

3. The method of claim 2,
wherein, prior to the modifying, the glass transition temperature of the polymer or polymer-derived particles comprising the polyfurfuryl alcohol is in the range between about 20° C. to 90° C., and
wherein the modifying increases the glass transition temperature of the polymer or polymer-derived particles comprising the polyfurfuryl alcohol to above about 100° C.

4. The method of claim 2,
wherein, prior to the modifying, the glass transition temperature of the polymer or polymer-derived particles comprising the polyfurfuryl alcohol is in the range between about 40° C. to 200° C., and
wherein the modifying eliminates the glass transition temperature of the polymer or polymer-derived particles comprising the polyfurfuryl alcohol such that a glass transition of the polymer or polymer-derived particles comprising the polyfurfuryl alcohol does not occur.

5. The method of claim 2,
wherein the polymer or polymer-derived particles are produced as polymer or polymer-derived particle droplets, and
wherein the glass transition temperature is modified by curing and at least partially solidifying the polymer or polymer-derived particle droplets.

6. The method of claim 1, wherein the surfactant comprises alkylbenzene sulfonic acid.

7. The method of claim 1, wherein the first mixture comprises the at least one stabilizing compound at a concentration of about 0.0001 wt. % to about 50.0000 wt. % of the first mixture.

8. The method of claim 1, wherein the at least one stabilizing compound comprises polyvinylpyrrolidone, a polyvinyl alcohol, a tri-block copolymer derived from polypropylene and polyethylene, gum acacia, polyvinyl acetate, polyacrylonitrile, or a combination thereof.

9. The method of claim 8, where the at least one stabilizing compound comprises the polyvinyl alcohol.

10. The method of claim 9, wherein a percent hydrolysis of the polyvinyl alcohol is in the range between about 40% to about 99%.

11. The method of claim 9, where a viscosity of a 4 wt. % solution of the polyvinyl alcohol at 20° C. is in the range between about 3 mPa·s to about 200 mPa·s.

12. The method of claim 1,
wherein the first mixture is a solution with the at least one stabilizing compound being dissolved into the aqueous solution, or, wherein the first mixture is a suspension with the at least one stabilizing compound being dispersed into the aqueous solution.

13. The method of claim 1, wherein the second mixture comprises the furfuryl alcohol, the derivative of furfuryl alcohol, or the mixture thereof, at a concentration of about 0.0001 wt. % to about 80.0000 wt. % of the second mixture.

14. The method of claim 1, wherein the second mixture comprises a heterogeneous solution of the at least one stabilizing compound, the aqueous solution, and the furfuryl alcohol, the derivative of furfuryl alcohol, or the mixture thereof.

15. The method of claim 14, wherein the heating induces a transition of the second mixture from the heterogenous solution to a homogeneous solution of the at least one stabilizing compound, the aqueous solution, and the furfuryl alcohol, the derivative of furfuryl alcohol, or the mixture thereof, with an aqueous phase and a hydrophobic emulsion phase.

16. The method of claim 1, wherein the second mixture comprises a homogenous solution of the at least one stabilizing compound, the aqueous solution, and the furfuryl alcohol, the derivative of furfuryl alcohol, or the mixture thereof, with an aqueous phase and a hydrophobic emulsion phase.

17. The method of claim 16, wherein the heating induces a transition of the second mixture from the homogenous solution to a heterogeneous solution of the at least one stabilizing compound, the aqueous solution, and the furfuryl alcohol, the derivative of furfuryl alcohol, or the mixture thereof.

18. The method of claim 1, wherein the heating heats the second mixture to a temperature between about 30° C. and about 100° C.

19. The method of claim 1, wherein the surfactant is mixed into the second mixture as a neat liquid or as part of another aqueous solution.

20. The method of claim 1, wherein the third mixture comprises the surfactant at a concentration of about 0.001 wt. % to about 30.0000 wt. % of the third mixture.

21. The method of claim 1, wherein the surfactant is mixed into the second mixture at a first temperature that is less than a second temperature of the second mixture.

22. The method of claim 1, wherein the surfactant is mixed into the second mixture at a first temperature that is greater than a second temperature of the second mixture.

23. The method of claim 1, wherein the surfactant is mixed into the second mixture at the same temperature as the second mixture.

24. The method of claim 1, wherein the polymer or polymer-derived particles exhibit a spherical shape, a near-spherical shape, or a spheroidal shape, or a combination thereof.

25. The method of claim 1, wherein the polymer or polymer-derived particles comprise an average particle size between about 100 nanometers to about 100 microns.

* * * * *